United States Patent
Gienger et al.

(10) Patent No.: US 12,517,504 B2
(45) Date of Patent: Jan. 6, 2026

(54) ANALYSIS METHOD AND DEVICES FOR SAME

(71) Applicant: Dürr Systems AG, Bietigheim-Bissingen (DE)

(72) Inventors: Andreas Gienger, Kirchheim unter Teck (DE); Oliver Sawodny, Stuttgart (DE); Simon Alt, Ditzingen (DE); Martin Weickgenannt, Bietigheim-Bissingen (DE); Markus Hummel, Urbach (DE); Tobias Schlotterer, Hechingen (DE); Jens Berner, Möglingen (DE); Hauke Bensch, Lübeck (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 17/608,473

(22) PCT Filed: Apr. 29, 2020

(86) PCT No.: PCT/DE2020/100358
§ 371 (c)(1),
(2) Date: Nov. 2, 2021

(87) PCT Pub. No.: WO2020/224716
PCT Pub. Date: Nov. 12, 2020

(65) Prior Publication Data
US 2022/0214676 A1    Jul. 7, 2022

(30) Foreign Application Priority Data

May 9, 2019 (DE) .................... 10 2019 112 099.3
May 10, 2019 (DE) .................... 10 2019 206 837.5

(51) Int. Cl.
*G05B 23/02* (2006.01)

(52) U.S. Cl.
CPC ...... *G05B 23/0254* (2013.01); *G05B 2223/02* (2018.08)

(58) Field of Classification Search
None
See application file for complete search history.

(56) References Cited

U.S. PATENT DOCUMENTS

| | | | |
|---|---|---|---|
| 4,186,793 | A | 2/1980 | Teplinsky et al. |
| 5,341,304 | A | 8/1994 | Sakamoto et al. |

(Continued)

FOREIGN PATENT DOCUMENTS

| | | |
|---|---|---|
| CN | 109270907 A | 1/2019 |
| DE | 41 13 556 A1 | 10/1991 |

(Continued)

OTHER PUBLICATIONS

Karami et al., "Fault detection and diagnosis for nonlinear systems: A new adaptive Gaussian mixture modeling approach", Elsevier 2018 (Year: 2018).*

(Continued)

*Primary Examiner* — Carlos R Ortiz Rodriguez
(74) *Attorney, Agent, or Firm* — Hanley, Flight & Zimmerman, LLC

(57) ABSTRACT

In order to provide a method for anomaly and/or fault recognition in an industrial-method plant, for example a painting plant, wherein anomalies and/or fault situations are recognisable simply and reliably by means of the method, it is proposed according to the invention that the method should comprise the following:

automatic generation of an anomaly and/or fault model of the industrial-method plant that comprises information on the occurrence probability of process values;
automatic input of process values of the industrial-method plant during operation thereof;

(Continued)

automatic recognition of an anomaly and/or fault situation by determining an occurrence probability by means of the anomaly and/or fault model on the basis of the process values of the industrial-method plant that have been input and by checking the occurrence probability for a limit value,

28 Claims, 19 Drawing Sheets

(56) References Cited

U.S. PATENT DOCUMENTS

| | | |
|---|---|---|
| 5,844,802 A | 12/1998 | Lepper et al. |
| 6,070,128 A | 5/2000 | Descales et al. |
| 6,141,598 A | 10/2000 | Nam |
| 6,516,239 B1 | 2/2003 | Madden et al. |
| 6,528,109 B1 * | 3/2003 | Filev ............... B05B 12/12 118/712 |
| 6,627,006 B1 | 9/2003 | Bartik-Himmler et al. |
| 6,801,822 B1 | 10/2004 | Fujiwara et al. |
| 6,850,874 B1 | 2/2005 | Higuerey et al. |
| 7,236,846 B1 | 6/2007 | Koyama et al. |
| 7,246,156 B2 | 7/2007 | Ginter et al. |
| 7,349,746 B2 * | 3/2008 | Emigholz .......... G05B 23/0208 702/182 |
| 10,467,502 B2 | 11/2019 | Ren |
| 11,353,835 B2 | 6/2022 | Kobayashi et al. |
| 2003/0061583 A1 | 3/2003 | Malhotra |
| 2003/0069781 A1 | 4/2003 | Hancock et al. |
| 2003/0139836 A1 | 7/2003 | Matthews et al. |
| 2004/0025972 A1 | 2/2004 | Bartik-Himmler et al. |
| 2004/0059553 A1 | 3/2004 | Heidemann et al. |
| 2005/0002560 A1 | 1/2005 | Yamamoto et al. |
| 2005/0010321 A1 | 1/2005 | Contos et al. |
| 2006/0190110 A1 | 8/2006 | Holt et al. |
| 2006/0257237 A1 | 11/2006 | McDonald et al. |
| 2006/0259198 A1 | 11/2006 | Brcka et al. |
| 2007/0220330 A1 | 9/2007 | Nauerz et al. |
| 2007/0226540 A1 | 9/2007 | Konieczny |
| 2009/0143872 A1 | 6/2009 | Thiele et al. |
| 2009/0216393 A1 | 8/2009 | Schimert |
| 2009/0250346 A1 | 10/2009 | Weschke et al. |
| 2010/0083029 A1 | 4/2010 | Erickson et al. |
| 2010/0161141 A1 | 6/2010 | Herre et al. |
| 2011/0264424 A1 | 10/2011 | Miwa et al. |
| 2011/0270482 A1 | 11/2011 | Holzer |
| 2011/0276828 A1 | 11/2011 | Tamaki et al. |
| 2012/0218405 A1 | 8/2012 | Terreno |
| 2012/0254141 A1 | 10/2012 | Poland et al. |
| 2013/0173332 A1 | 7/2013 | Ho et al. |
| 2014/0351642 A1 | 11/2014 | Bates et al. |
| 2014/0358601 A1 | 12/2014 | Smiley et al. |
| 2015/0277429 A1 | 10/2015 | Drath et al. |
| 2015/0279129 A1 | 10/2015 | Ishikawa |
| 2016/0193620 A1 | 7/2016 | Schulze |
| 2016/0299500 A1 | 10/2016 | Drasovean |
| 2016/0343122 A1 | 11/2016 | Jing et al. |
| 2017/0041452 A1 | 2/2017 | Amann |
| 2017/0139382 A1 | 5/2017 | Sayyarrodsari et al. |
| 2017/0185058 A1 | 6/2017 | Holverson et al. |
| 2017/0306986 A1 | 10/2017 | McLean, Jr. |
| 2017/0308049 A1 | 10/2017 | Fujii et al. |
| 2018/0036845 A1 | 2/2018 | Thorwarth |
| 2018/0120028 A1 | 5/2018 | Robbin |
| 2018/0157249 A1 | 6/2018 | Muto |
| 2018/0189242 A1 | 7/2018 | Fukushima et al. |
| 2018/0293673 A1 | 10/2018 | Ortiz Obando |
| 2018/0326591 A1 | 11/2018 | Hausler |
| 2018/0340515 A1 | 11/2018 | Huyn et al. |
| 2018/0356154 A1 | 12/2018 | Iglauer et al. |
| 2019/0019096 A1 | 1/2019 | Yoshida et al. |
| 2019/0151924 A1 | 5/2019 | Nillies |
| 2019/0179282 A1 | 6/2019 | Götz et al. |
| 2019/0204815 A1 | 7/2019 | Ota et al. |
| 2019/0243872 A1 | 8/2019 | Komatsu et al. |
| 2019/0383599 A1 | 12/2019 | Gregory et al. |
| 2020/0012270 A1 | 1/2020 | Hollender et al. |
| 2020/0055558 A1 | 2/2020 | Damoulis et al. |
| 2020/0089209 A1 | 3/2020 | Amemiya |
| 2020/0216130 A1 | 7/2020 | Von Krauland |
| 2020/0306780 A1 | 10/2020 | Maas et al. |
| 2020/0401965 A1 | 12/2020 | Wu et al. |
| 2021/0223167 A1 | 7/2021 | Jagiella |
| 2021/0261374 A1 | 8/2021 | Celli |
| 2022/0197271 A1 | 6/2022 | Alt et al. |
| 2022/0214670 A1 | 7/2022 | Herre et al. |
| 2022/0214671 A1 | 7/2022 | Alt et al. |
| 2022/0215305 A1 | 7/2022 | Wieland et al. |
| 2022/0237064 A1 | 7/2022 | Alt et al. |
| 2023/0325271 A1 | 10/2023 | Nakamura et al. |

FOREIGN PATENT DOCUMENTS

| | | |
|---|---|---|
| DE | 10 2004 048 937 A1 | 5/2005 |
| DE | 10 2004 019 151 A1 | 11/2005 |
| DE | 10 2004 024 262 A1 | 12/2005 |
| DE | 10 2006 022 614 A1 | 11/2006 |
| DE | 10 2006 045 429 A1 | 4/2007 |
| DE | 10 2006 055 297 A1 | 5/2008 |
| DE | 10 2006 056 879 A1 | 6/2008 |
| DE | 10 2008 062 630 A1 | 6/2010 |
| DE | 10 2008 060 115 B4 | 8/2010 |
| DE | 10 2012 213 481 A1 | 2/2014 |
| DE | 10 2014 201 273 A1 | 7/2015 |
| DE | 10 2015 119 240 B3 | 3/2017 |
| DE | 10 2016 012 451 A1 | 1/2018 |
| DE | 10 2017 101 228 A1 | 7/2018 |
| DE | 10 2017 208 103 A1 | 11/2018 |
| DE | 10 2017 113 343 A1 | 12/2018 |
| DE | 10 2017 217 760 A1 | 4/2019 |
| DE | 102019112099 B3 | 6/2020 |
| DE | 102019206833 A1 | 11/2020 |
| DE | 102019206846 A1 | 11/2020 |
| EP | 1 081 569 A2 | 3/2001 |
| EP | 1 176 388 A2 | 1/2002 |
| EP | 2930578 A2 | 2/2015 |
| EP | 3699708 A1 | 10/2017 |
| EP | 3 398 698 A1 | 11/2018 |
| EP | 3294463 B1 | 3/2019 |
| JP | H04223826 A | 8/1992 |
| JP | H04358556 A | 12/1992 |
| JP | 1994034404 A | 2/1994 |
| JP | H06148090 A | 5/1994 |
| JP | H06155252 A | 6/1994 |
| JP | H06235094 A | 8/1994 |
| JP | 2000266570 A | 9/2000 |
| JP | 2004354250 A | 12/2004 |
| JP | 2005309616 A | 11/2005 |
| JP | 2006218426 A | 8/2006 |
| JP | 2010511232 A | 4/2010 |
| JP | 2010122847 A | 6/2010 |
| JP | 2012128583 A | 7/2012 |
| JP | 2013045281 A | 3/2013 |
| JP | 2013054626 A | 3/2013 |
| JP | 2015184942 A | 10/2015 |
| JP | 2016081482 A | 5/2016 |
| JP | 2016538645 A | 12/2016 |
| JP | 2017199074 A | 11/2017 |
| JP | 2018109876 A | 7/2018 |
| JP | 2018120343 A | 8/2018 |
| JP | 2018200043 A | 12/2018 |
| JP | 2019012473 A | 1/2019 |
| JP | 2019505754 A | 2/2019 |
| JP | 2019049391 A | 3/2019 |
| JP | 2019066957 A | 4/2019 |
| WO | 03042770 A1 | 5/2003 |
| WO | 2004079057 A1 | 9/2004 |
| WO | 2008078910 A1 | 7/2008 |
| WO | 2010082322 A1 | 7/2010 |
| WO | 2015077890 A1 | 6/2015 |
| WO | 2016195092 A1 | 12/2016 |
| WO | 2017/086194 A1 | 5/2017 |
| WO | 2018047804 A1 | 3/2018 |

(56) References Cited

FOREIGN PATENT DOCUMENTS

| | | |
|---|---|---|
| WO | 2018220813 A1 | 12/2018 |
| WO | 2019077656 A1 | 4/2019 |
| WO | 2020062186 A1 | 4/2020 |

OTHER PUBLICATIONS

Riascos, L. A. M., Lucas Antonio Moscato, and Paulo Eigi Miyagi. "Detection and treatment of faults in manufacturing systems based on Petri Nets." Journal of the Brazilian society of mechanical Sciences and Engineering 26 (2004): 280-289. (Year: 2004).*
Wu, Zhenhua, and Sheng-Jen Hsieh. "A realtime fuzzy Petri net diagnoser for detecting progressive faults in PLC based discrete manufacturing system." The International Journal of Advanced Manufacturing Technology 61 (2012): 405-421. (Year: 2012).*
Wu, Zhenhua, Sheng-Jen Hsieh, and Jianzhi Li. "Sensor deployment based on fuzzy graph considering heterogeneity and multiple-objectives to diagnose manufacturing system." Robotics and Computer-Integrated Manufacturing 29.1 (2013): 192-208. (Year: 2013).*
Melani, Arthur HA, et al. "Fault diagnosis based on Petri Nets: the case study of a hydropower plant." IFAC—PapersOnLine 49.31 (2016): 1-6. (Year: 2016).*
James, Ajith Tom, O. P. Gandhi, and S. G. Deshmukh. "Fault diagnosis of automobile systems using fault tree based on digraph modeling." International Journal of System Assurance Engineering and Management 9 (2018): 494-508. (Year: 2018).*
Farruggia, Alfonso. "A probabilistic approach to anomaly detection for Wireless Sensor Networks." (2012). (Year: 2012).*
Andrew Kusiak et al.,"The prediction and diagnosis of wind turbine faults," dated Jun. 9, 2010, Elsevier, 9 pages.
Zhenyu Wu et al., "An Integrated Ensemble Learning Model for Imbalanced Fault Diagnostics and Prognostics," dated Feb. 19, 2018, IEEE Access, 10 pages.
European Patent Office, International Search Report, issued in connection with Application No. PCT/DE2020/100358, dated Jul. 15, 2020, 6 pages.
European Patent Office, Written Opinion, issued in connection with Application No. PCT/DE2020/100358, dated Jul. 15, 2020, 8 pages.
European Patent Office, International Search Report, issued in connection with Application No. PCT/DE2020/100360, dated Jul. 15, 2020, 6 pages.
European Patent Office, Written Opinion, issued in connection with Application No. PCT/DE2020/100360, dated Jul. 15, 2020, 8 pages.
European Patent Office, International Search Report, issued in connection with Application No. PCT/DE2020/100357, dated Aug. 11, 2020, 6 pages.
European Patent Office, Written Opinion, issued in connection with Application No. PCT/DE2020/100357, dated Aug. 11, 2020, 6 pages.
European Patent Office, International Search Report, issued in connection with Application No. PCT/DE2020/100359, dated Oct. 13, 2020, 8 pages.
European Patent Office, Written Opinion, Issued in connection with Application No. PCT/DE2020/100359, dated Oct. 13, 2020, 15 pages.
European Patent Office, International Search Report, issued in connection with Application No. PCT/DE2020/100356, dated Oct. 13, 2020, 8 pages.
European Patent Office, Written Opinion, issued in connection with Application No. PCT/DE2020/100356, dated Oct. 13, 2020, 13 pages.
European Patent Office, International Search Report, issued in connection with Application No. PCT/DE2020/100355, dated Oct. 21, 2020, 8 pages.
European Patent Office, Written Opinion, issued in connection with Application No. PCT/DE2020/100355, dated Oct. 21, 2020, 13 pages.
United States Patent and Trademark Office, "Non-Final Office Action," issued in connection with U.S. Appl. No. 17/608,467, Jun. 22, 2023, 14 pages.
United States Patent and Trademark Office, "Final Office Action," issued in connection with U.S. Appl. No. 17/608,472, Jun. 29, 2023, 17 pages.
United States Patent and Trademark Office, "Non-Final Office Action," issued in connection with U.S. Appl. No. 17/608,469, Apr. 5, 2023, 22 pages.
Lange, "Machine Learning Based Error Prediction for Spray Painting Applications," Chalmers University of Technology and University of Gothenburg, 2016, 59 pages.
United States Patent and Trademark Office, "Final Office Action," issued in connection with U.S. Appl. No. 17/608,472, Jun. 20, 2023, 16 pages.
Google, "Google Scholar/Patents search—text refined: Industrial plant fault database," Google, retrieved Jun. 14, 2023, 2 pages.
United States Patent and Trademark Office, "Non-Final Office Action," issued in connection with U.S. Appl. No. 17/608,472, Jan. 18, 2023, 14 pages.
Google, "Google Scholar/Patents search—text refined: Industrial plant fault cause historical database," Google, retrieved Jan. 11, 2023, 3 pages.
United States Patent and Trademark Office, "Advisory Action," issued in connection with U.S. Appl. No. 17/608,472, Sep. 15, 2023, 16 pages.
European Patent Office, "Communication Under Article 94(3) EPC," issued in connection with European Application No. 20 728 915.8, Sep. 18, 2023, 10 pages, with machine English translation.
United States Patent and Trademark Office, "Notice of Allowance and Fee(s) Due," issued in connection with U.S. Appl. No. 17/608,467, Oct. 12, 2023, 7 pages.
United States Patent and Trademark Office, "Notice of Allowance and Fee(s) Due," issued in connection with U.S. Appl. No. 17/608,469, Oct. 18, 2023, 12 pages.
United States Patent and Trademark Office, "Non-Final Office Action," issued in connection with U.S. Appl. No. 17/608,472, Oct. 19, 2023, 18 pages.
Google, "Google Scholar/Patents search—industrial plant fault database," Google, retrieved Oct. 13, 2023, 2 pages.
United States Patent and Trademark Office, "Notice of Allowability," issued in connection with U.S. Appl. No. 17/608,469, Oct. 31, 2023, 10 pages.
United States Patent and Trademark Office, "Non-Final Office Action," issued in connection with U.S. Appl. No. 17/608,470, Jan. 19, 2024, 19 pages.
United States Patent and Trademark Office, "Non-Final Office Action," issued in connection with U.S. Appl. No. 17/608,468, Dec. 22, 2023, 20 pages.
United States Patent and Trademark Office, "Final Office Action," issued in connection with U.S. Appl. No. 17/608,472, May 3, 2024, 15 pages.
Google, "Google Scholar/Patents search—industrial plant fault database," Google, retrieved Apr. 12, 2024, 2 pages.
United States Patent and Trademark Office, "Final Office Action," issued in connection with U.S. Appl. No. 17/608,468, Apr. 11, 2024, 17 pages.
Japan Patent Office, "Notice of Reasons for Refusal," issued in connection with Japanese Patent Application No. 2021-566047, Jan. 26, 2024, 8 pages, with English translation.
Japan Patent Office, "Notice of Reasons for Refusal," issued in connection with Japanese Patent Application No. 2021-565988, Feb. 29, 2024, 10 pages, with English translation.
Japan Patent Office, "Notice of Reasons for Refusal," issued in connection with Japanese Patent Application No. 2021-565985, Mar. 6, 2024, 10 pages, with English translation.
Japan Patent Office, "Notice of Reasons for Refusal," issued in connection with Japanese Patent Application No. 2021-566108, dated Mar. 11, 2024, mailed Mar. 19, 2024, 10 pages, with English translation.
Japan Patent Office, "Notice of Reasons for Refusal," issued in connection with Japanese Patent Application No. 2021-566002, Mar. 7, 2024, 8 pages, with English translation.

(56) References Cited

OTHER PUBLICATIONS

European Patent Office, "Extended European Search Report," issued in connection with European Application No. 23 219 822.6, Apr. 17, 2024, 16 pages, with machine English translation.

Japan Patent Office, "Notice of Reasons for Refusal," issued in connection with Japanese Patent Application No. 2021-566091, Mar. 11, 2024, 10 pages, with English translation.

United States Patent and Trademark Office, "Non-Final Office Action," issued in connection with U.S. Appl. No. 17/608,470, Jul. 18, 2024, 26 pages.

United States Patent and Trademark Office, "Non-Final Office Action," issued in connection with U.S. Appl. No. 17/608,472, Aug. 23, 2024, 13 pages.

Google, "Google Scholar/Patents search—industrial plant fault database," Google, retrieved Aug. 20, 2024, 2 pages.

United States Patent and Trademark Office, "Non-Final Office Action," issued in connection with U.S. Appl. No. 18/402,412, Aug. 26, 2024, 13 pages.

United States Patent and Trademark Office, "Non-Final Office Action," issued in connection with U.S. Appl. No. 17/608,468, Oct. 2, 2024, 19 pages.

Korean Intellectual Property Office, "Notification of Reasons for Refusal," issued in connection with Korean Patent Application No. 10-2021-7040083, dated Feb. 17, 2025, 17 pages. [English Translation Included].

United States Patent and Trademark Office, "Non-Final Office Action," Issued In connection with U.S. Appl. No. 17/608,470, dated May 2, 2025, 16 pages.

United States Patent and Trademark Office, "Final Office Action," issued in connection with U.S. Appl. No. 17/608,472, dated Dec. 18, 2024, 19 pages.

United States Patent and Trademark Office, "Final Office Action," issued in connection with U.S. Appl. No. 17/608,470, Dec. 12, 2024, 29 pages.

Korean Intellectual Property Office, "Notice of Reasons for Refusal," issued in connection with Korean Patent Application No. 10-2021-7040253, mailed on Dec. 12, 2024, 6 pages (English translation).

United States Patent and Trademark Office, "Advisory Action," issued in connection with U.S. Appl. No. 17/608,470, Feb. 26, 2025, 3 pages.

Korean Patent Office, "Notice of Reason(s) for Refusal", issued in connection with KR Patent Application No. 10-2021-7040082 on Feb. 17, 2025, 9 pages.

United States Patent and Trademark Office, "Non-Final Office Action," issued in connection with U.S. Appl. No. 17/608,468, dated Mar. 6, 2025, 14 pages.

United States Patent and Trademark Office, "Final Office Action," issued in connection with U.S. Appl. No. 18/402,412, dated Mar. 18, 2025, 9 pages.

United States Patent and Trademark Office, "Advisory Action," issued in connection with U.S. Appl. No. 18/402,412, dated Jun. 3, 2025, 23 pages.

United States Patent and Trademark Office, "Final Office Action," issued in connection with U.S. Appl. No. 17/608,468, dated Jun. 18, 2025, 14 pages.

United States Patent and Trademark Office, "Notice of Allowance and Fee(s) Due," issued in connection with U.S. Appl. No. 18/402,412, dated Jul. 1, 2025, 8 pages.

Korean Patent Office, "Notice of Reasons for Refusal," issued in connection with Korean Patent Application No. 10-2021-7039938, dated Aug. 1, 2025, 7 pages. [English translation included.].

Korean Patent Office, "Notice of Reasons for Refusal," issued in connection with Korean Patent Application No. 10-2021-7040253, dated Aug. 23, 2025, 12 pages. [English translation included.].

United States Patent and Trademark Office, "Notice of Allowance and Fee(s) Due," issued in connection with U.S. Appl. No. 17/608,470, dated Sep. 25, 2025, 10 pages.

* cited by examiner

ANALYSIS METHOD AND DEVICES FOR SAME

RELATED APPLICATIONS

This application is a national phase of international application No. PCT/DE2020/100358, filed on Apr. 29, 2020, and claims the benefit of German application No. 10 2019 112 099.3, filed on May 9, 2019, and German application No. 10 2019 206 837.5, filed on May 10, 2019, all of which are incorporated herein by reference in their entireties and for all purposes.

FIELD OF DISCLOSURE and BACKGROUND

The disclosure relates to a method for fault analysis in an industrial-method plant, for example a painting plant.

SUMMARY

An object of the disclosure is to provide a method for fault analysis in an industrial-method plant, for example a painting plant, by means of which fault situations are analysable simply and reliably.

This object is achieved by a method for fault analysis in an industrial-method plant, for example a painting plant.

The method for fault analysis in an industrial-method plant, for example a painting plant, preferably comprises the following:

in particular automatic recognition of a fault situation in the industrial-method plant;

storage of a fault situation data set for the respective recognised fault situation, in a fault database;

automatic determination of a cause of the fault for the fault situation and/or automatic determination of process values that are relevant to the fault situation, on the basis of the fault data set of a respective recognised fault situation.

In the context of this description and the attached claims, the term "process values causing the fault situation" is understood in particular to mean process values that cause the fault situation and/or are related thereto.

In the context of this description and the attached claims, the term "in particular" is used exclusively to describe possible discretionary and/or optional features.

It may be favourable if the fault situation is recognised automatically by means of a message system.

In one embodiment of the method for fault analysis in an industrial-method plant, it is provided, for the purpose of automatically determining the fault cause for the fault situation and/or automatically determining the process values relevant to the fault situation, for one or more process values to be automatically linked to the fault situation on the basis of one or more of the following link criteria:

prior linking from a message system;

an association of a process value with the same part of the industrial-method plant as that in which the fault situation occurred;

linking a process value to a historical fault situation on the basis of active selection by a user;

an active selection of the process value by a user.

In one embodiment of the method for fault analysis in an industrial-method plant, it is provided, for the purpose of automatically determining the fault cause for the fault situation and/or automatically determining the process values relevant to the fault situation, for automatic prioritisation of the process values linked to the fault situation to be carried out automatically on the basis of one or more of the following prioritisation criteria:

a process relevance of the process values;

a position of a process value or of a sensor determining the process value within the industrial-method plant;

an amount by which a process value deviates from a defined process window and/or a normal condition;

a prioritisation of historical process values in historical fault situations; by adopting a prioritisation of the fault cause and/or the process values from a message system;

a prioritisation by a user.

Prioritisation based on the process relevance of the process values is preferably performed such that process-critical process values are given higher priority.

In the context of this description and the attached claims, the term "process-critical process value" is understood in particular to mean a process value that is stored as process-critical in the message system and/or has been defined as process-critical by a user.

A prioritisation based on a position of the process value or of a sensor determining the process value within the industrial-method plant is preferably performed such that process values that are associated with the same plant part, a nearby plant part and/or a comparable plant part are given higher priority.

In the context of this description and the attached claims, the term "comparable plant parts" is understood in particular to mean plant parts of similar or identical layout.

Comparable plant parts are for example industrial supply air plant of the same or similar construction, conditioning modules of an industrial supply air plant that have the same or similar construction, or pumps or motors of the same or similar construction.

A position of the sensor that determines the process value is preferably identified using a classification comprising a numbering system (the so-called plant numbering system) in the industrial-method plant.

Process values are designated unambiguously, preferably by means of the numbering system.

Preferably, process values are prioritised in dependence on their designation in the numbering system.

For the purpose of unambiguous designation of sensors and/or process values, the numbering system preferably comprises the designation of a functional unit, the designation of a functional group of the respective functional unit and/or the designation of a functional element of the respective functional group with which the respective sensor and/or process value is associated.

Further, it may be favourable if the unambiguous designation of a process value by means of the numbering system comprises a designation of a type of measured variable, for example temperature, throughflow, pressure.

For example, a supply air plant of a painting plant is a functional unit, wherein a conditioning module of the supply air plant is a functional group and a pump of the supply air plant is a functional element.

A normal condition of a process value is preferably determined by means of a method for anomaly and/or fault recognition.

A prioritisation based on prioritising historical process values in historical fault situations is preferably performed such that process values are prioritised analogously with the historical fault situation.

In one embodiment of the method for fault analysis in an industrial-method plant, it is provided, for the purpose of automatically determining the fault cause for the fault situation and/or automatically determining the process values relevant to the fault situation, for further fault causes and/or process values to be proposed, wherein the proposal is made automatically on the basis of one or more of the following proposal criteria:

a process relevance of the process values;
a position of a process value or of a sensor determining the process value within the industrial-method plant;
an amount by which a process value deviates from a defined process window and/or a normal condition;
a prioritisation of historical process values in historical fault situations;
physical dependences of the process values.

It is preferable for a process-critical process value to be preferably proposed.

A proposal based on a position within the industrial-method plant of the process value or of a sensor that determines the process value is preferably made such that process values that are associated with the same plant part, a nearby plant part and/or a comparable plant part are proposed by preference.

Preferably, process values are proposed in dependence on their designation in the numbering system.

A proposal based on a prioritisation of historical process values in historical fault situations is preferably made such that process values of high priority in the historical fault situation are preferably proposed.

For the purpose of determining a proposal based on physical dependences of the process values, the physical dependences are preferably defined by a user as an expert rule.

Preferably, a prioritisation of the proposed fault causes and/or process values is modifiable by a user.

In one embodiment of the method for fault analysis in an industrial-method plant, it is provided for historical fault situations to be determined from a fault database using one or more of the following similarity criteria:

a fault classification of the historical fault situation;
a historical fault situation in the same or a comparable plant part;
process values of the historical fault situation that are identical or similar to process values of the recognised fault situation.

It is preferable for historical fault situations having a fault classification that is identical to the recognised fault situation to be preferably determined.

The fact that the process values of the historical fault situation are identical or similar to the process values of the recognised fault situation is preferably determined by a comparison algorithm.

In one embodiment of the method for fault analysis in an industrial-method plant, it is provided for historical process values that are identical or similar to process values of the recognised fault situation to be determined from a process database.

Preferably, for the purpose of determining the historical process values a process database is searched. It may be favourable if the fact that the process values are identical or similar is determined by means of a comparison algorithm.

Preferably, determining the historical process values is performed automatically.

In one embodiment of the method for fault analysis in an industrial-method plant, it is provided for the determined historical process values to be characterised as belonging to a historical fault situation.

In one embodiment of the method for fault analysis in an industrial-method plant, it is provided, for a recognised fault situation, for a fault situation data set to be stored in a fault database.

In one embodiment of the method for fault analysis in an industrial-method plant, it is provided for a respective fault identification data set to comprise one or more of the following fault situation data:

a fault classification of the fault situation;
process values that are linked to the fault situation, based on a prior linking from a message system;
information on a point in time at which a respective fault situation occurred;
information on a duration for which a respective fault situation occurred;
information on the location in which a respective fault situation occurred;
alarms;
status messages.

In one embodiment of the method for fault analysis in an industrial-method plant, it is provided for the fault situation data set of a respective fault situation to comprise fault identification data for unambiguous identification of the recognised fault situation.

Preferably, the fault identification data are usable for unambiguous designation of a fault situation.

In one embodiment of the method for fault analysis in an industrial-method plant, it is provided for documentation data and fault elimination data to be stored in the fault situation data set of a respective fault situation.

Documentation data preferably comprise operating instructions, manuals, circuit diagrams, procedure diagrams and/or data sheets of the plant parts that are affected by a respective fault situation.

Fault elimination data preferably comprise information on the elimination of a fault situation, in particular procedural instructions for eliminating a fault situation.

In particular, documentation data and fault elimination data are also appendable to the fault situation data set by a user.

In one embodiment of the method for fault analysis in an industrial-method plant, it is provided for process values to be stored during operation of the industrial-method plant, synchronised with a recognised fault situation.

In one embodiment of the method for fault analysis in an industrial-method plant, it is provided for process values to be provided with a time stamp by means of which the process values are configured to be unambiguously associated with a point in time.

Further, the disclosure relates to a fault analysis system for fault analysis in an industrial-method plant, for example a painting plant, wherein the system takes a form and is constructed for the purpose of carrying out the method according to examples disclosed herein for fault analysis in an industrial-method plant, for example a painting plant.

Further, the disclosure relates to an industrial control system that comprises a fault analysis system according to examples disclosed herein.

Further, the disclosure relates to a method for predicting process deviations in an industrial-method plant, for example a painting plant.

A further object of the disclosure is to provide a method for predicting process deviations in an industrial-method plant, for example a painting plant, by means of which process deviations are predictable simply and reliably.

This object is achieved by a method for predicting process deviations in an industrial-method plant, for example a painting plant.

The method for predicting process deviations in an industrial-method plant, for example a painting plant, preferably comprises the following:
- automatic generation of a prediction model;
- prediction of process deviations during operation of the industrial-method plant, using the prediction model.

Preferably, a process deviation of production-critical process values is predictable by means of the prediction model.

In one embodiment of the method for predicting process deviations, it is provided for the method for predicting process deviations to be carried out in an industrial supply air plant, a pre-treatment station, a station for cathodic dip coating and/or a drying station.

Industrial supply air plants, pre-treatment stations and/or stations for cathodic dip coating are in particular very sluggish industrial-method plants.

Consequently, production-critical process values of industrial-method plants of this kind change only very slowly during operation thereof.

Because of the high inertia of industrial-method plants of this kind, a process deviation during operation of the industrial-method plant is preferably predictable at an early stage by means of the prediction model.

Preferably, it is thus possible to achieve a time gain for repair and/or maintenance of industrial-method plants of this kind before a process deviation occurs.

An industrial supply air plant preferably comprises a plurality of conditioning modules, for example a pre-heating module, a cooling module, a post-heating module and/or a wetting module.

Preferably, the prediction model that is generated is transferable to similar industrial-method plants.

For example, it is conceivable for a prediction model that was generated for a pre-treatment station to be usable for a station for cathodic dip coating.

In one embodiment of the method for predicting process deviations, it is provided for process deviations of production-critical process values in the industrial-method plant to be predicted by means of the prediction model, in particular on the basis of changing process values during operation of the industrial-method plant.

In the context of this description and the attached claims, the term "production-critical process values" is understood in particular to mean process values of which the deviation from a predetermined process window results in a deviation in quality, in particular deficiencies in quality.

Production-critical process values of an industrial supply air plant are for example the temperature and relative air humidity of the air conditioned by means of the industrial supply air plant, in particular at an exhaust part of the industrial supply air plant.

In a painting plant, air that is conditioned by means of an industrial supply air plant is preferably fed to a painting booth, and thus preferably acts directly on a treatment quality of the workpieces treated in the painting booth, in particular the vehicle bodies treated in the painting booth.

For example, it is possible to use the prediction model to predict process deviations of production-critical process values for a prediction horizon of at least approximately 10 minutes, for example at least approximately 15 minutes, preferably at least approximately 20 minutes.

In one embodiment of the method for predicting process deviations, it is provided, for the purpose of automatically generating the prediction model, to store process values and/or status variables during operation of the industrial-method plant for a predetermined period.

If the industrial-method plant is an industrial supply air plant, the stored process values and/or status variables preferably comprise the following:
- target variables of the industrial supply air plant, in particular temperature and relative air humidity of the air conditioned by means of the industrial supply air plant, in particular at an exhaust part of the industrial supply air plant;
- control variables, in particular valve positions of valves of heating and/or cooling modules of the industrial supply air plant, rotational frequencies of pumps, in particular the wetting pump, and/or rotational frequencies of ventilators;
- internal variables, in particular supply and/or return flow temperatures in the heating and/or cooling modules of the industrial supply air plant and/or air conditions between conditioning modules;
- measured disruption variables, in particular external temperature and/or external relative air humidity at an intake part of the industrial supply air plant;
- unmeasured disruption variables; and/or
- status variables, in particular wetting pump (on/off), manual mode for pumps (on/off), feed valves (open/closed), ventilator (on/off).

In the context of this description and the attached claims, the term "process values" is understood in particular to mean continuous time-dependent signals.

In the context of this description and the attached claims, the term "status variables" is understood in particular to mean discrete time-dependent events.

In one embodiment of the method for predicting process deviations, it is provided for the predetermined period for which process values and/or status variables are stored during operation of the industrial-method plant to be predetermined in dependence on one or more of the following criteria:
- the industrial-method plant is in an operation-ready state, in particular for a production operation, for at least approximately 60%, preferably for at least approximately 80%, of the predetermined period;
- the industrial-method plant is in a production-ready state for at least approximately 60%, preferably for at least approximately 80%, of the predetermined period;
- during the predetermined period, the industrial-method plant is operated in particular using all possible operating strategies;
- a predetermined number of process deviations and/or disruptions in the predetermined period.

If the industrial-method plant is an industrial supply air plant, it is preferably in an operation-ready state for a production operation if:
- a ventilator of the industrial supply air plant is in operation (status variable of the ventilator is "on");
- conditioning modules of the industrial supply air plant are operated in an automatic mode;
- at least one control valve is open; and/or
- a wetting pump is in operation (status variable of the wetting pump is "on").

In the context of this description and the attached claims, the term "production-ready state of an industrial-method plant" is understood in particular to mean that target variables of the industrial-method plant are within a predetermined process window.

If the industrial-method plant is an industrial supply air plant, it is in a production-ready state if the target variables of the industrial supply air plant, in particular temperature and relative air humidity of the air conditioned by means of the industrial supply air plant, in particular at an exhaust part of the industrial supply air plant, are within a predetermined process window.

A pre-treatment station or a station for cathodic dip coating are in particular operable only with a single operating strategy.

An industrial supply air plant is operable in particular with a plurality of operating strategies, in particular in dependence on ambient conditions.

An industrial supply air plant is operable for example with the following operating strategies: heating/wetting, cooling/heating, cooling/wetting, cooling, heating, wetting.

If the industrial-method plant is an industrial supply air plant, it is in particular conceivable for process values and/or status variables for automatically generating the prediction model to be stored for a period of for example at least approximately 6 months, in particular for a period of at least approximately 9 months, preferably for a period of at least approximately 12 months.

If the industrial-method plant is a pre-treatment station or a station for cathodic dip coating, it is in particular conceivable for process values and/or status variables for automatically generating the prediction model to be stored for a period of for example at least approximately 2 weeks, in particular for a period of at least approximately 4 weeks, preferably for a period of at least approximately 6 weeks.

For example, it is conceivable for at least approximately 30, preferably at least approximately 50, process deviations and/or disruptions to occur in the predetermined period.

It is in particular also conceivable for the predetermined period during which process values and/or status variables are stored during operation of the industrial-method plant to comprise a plurality of non-contiguous sub-periods.

If the period during which process values and/or status variables are stored during operation of the industrial-method plant comprises a plurality of non-contiguous sub-periods, then the sub-periods preferably each have one or more of the following criteria:
- a minimum duration of the sub-period, for example at least approximately 30 minutes;
- operation of the industrial-method plant in a production-ready and/or already operating state at the start of the sub-period;
- operation of the industrial-method plant in an already operating state at the end of a sub-period.

In one embodiment of the method for predicting process deviations, it is provided, for the purpose of generating the prediction model, for a machine learning method to be carried out, wherein the process values and/or status variables that are stored for the predetermined period are used for generating the prediction model.

Machine learning methods that are carried out for the purpose of automatically generating the prediction model preferably comprise one or more of the following: gradient boosting, a random forest, a support vector machine.

In one embodiment of the method for predicting process deviations, it is provided for the machine learning method to be carried out on the basis of features that are extracted from the process values and/or status variables stored for the predetermined period.

In one embodiment of the method for predicting process deviations, it is provided for one or more of the following to be used for the purpose of extracting features:
- statistical key figures;
- coefficients from a principal component analysis;
- linear regression coefficients;
- dominant frequencies and/or amplitudes from the Fourier spectrum.

Statistical key figures comprise for example a minimum, a maximum, a median, an average and/or a standard deviation.

In one embodiment of the method for predicting process deviations, it is provided for a selected number of prediction data sets with process deviations and a selected number of prediction data sets with no process deviations to be used for training the prediction model.

In particular, it is conceivable for the selected number of prediction data sets with process deviations to correspond at least approximately to the selected number of prediction data sets with no process deviations.

In particular, it is conceivable for the selected number of prediction data sets with process deviations and the selected number of prediction data sets with no process deviations to be identical.

In one embodiment of the method for predicting process deviations, it is provided for selection of the number of prediction data sets with a process deviation to be made on the basis of one or more of the following criteria:
- a minimum time interval between two prediction data sets with process deviations;
- an automatic selection on the basis of defined rules;
- a selection by a user.

A minimum time interval between two prediction data sets with process deviations is for example at least approximately two hours.

In one embodiment of the method for predicting process deviations, it is provided for prediction data sets with process deviations to be characterised as such if a process deviation occurs within a predetermined time interval.

A predetermined time interval preferably comprises a timespan of the prediction data set and a selected prediction horizon.

For example, it is conceivable for the timespan of the prediction data set to be 30 minutes and for the selected prediction horizon to be 15 minutes.

A prediction data set with no process deviations is characterised as such if no process deviations are present within the predetermined time interval.

In one embodiment of the method for predicting process deviations, it is provided for the process values and/or status variables that are stored for the predetermined period to be grouped into prediction data sets by pre-processing.

In one embodiment of the method for predicting process deviations, it is provided for the pre-processing to comprise the following:
- regularisation of the process values stored for the predetermined period;
- grouping the process values and/or status variables into prediction data sets by classifying the process values and/or status variables into time windows with a time offset.

Preferably, the duration of a time window is greater than the time offset.

The duration of a time window is for example 30 minutes. The time offset is for example 5 minutes.

Preferably, prediction data sets that succeed one another in time here each comprise process values and/or status variables with a time overlap, for example of 5 minutes.

Further, the disclosure relates to a prediction system for predicting process deviations in an industrial-method plant, wherein the prediction system takes a form and is constructed for the purpose of carrying out the method according to examples disclosed herein for predicting process deviations in an industrial-method plant, for example a painting plant.

Further, the disclosure relates to an industrial control system that comprises a prediction system according to examples disclosed herein.

The method according to examples disclosed herein for predicting process deviations preferably has individual or a plurality of the features and/or advantages described in conjunction with the method according to examples disclosed herein for fault analysis.

Further, the method according to examples disclosed herein for fault analysis preferably has individual or a plurality of the features and/or advantages described in conjunction with the method according to examples disclosed herein for predicting process deviations.

Further, the disclosure relates to a method for anomaly and/or fault recognition in an industrial-method plant, for example a painting plant.

The disclosure has the further object of providing a method for anomaly and/or fault recognition in an industrial-method plant, for example a painting plant, wherein anomalies and/or fault situations are recognisable simply and reliably by means of the method.

This object is achieved by a method for anomaly and/or fault recognition in an industrial-method plant, for example a painting plant.

The method for anomaly and/or fault recognition in an industrial-method plant, for example a painting plant, preferably comprises the following:
- automatic generation of an anomaly and/or fault model of the industrial-method plant that comprises information on the occurrence probability of process values;
- automatic input of process values of the industrial-method plant during operation thereof;
- automatic recognition of an anomaly and/or fault situation by determining an occurrence probability by means of the anomaly and/or fault model on the basis of the process values of the industrial-method plant that have been input and by checking the occurrence probability for a limit value.

Preferably, fault situations, that is to say defects and/or failures in components, sensors and/or actuators, are identifiable by means of the method for anomaly and/or fault recognition.

Preferably, a normal condition of the industrial-method plant is determinable in an automated manner by the method for anomaly and/or fault recognition in an industrial-method plant.

In particular, static and/or dynamic relationships in the industrial-method plant are describable by means of the anomaly and/or fault model.

In the context of this description and the attached claims, the term "anomaly" is understood in particular to mean a deviation of a process value from a normal condition.

Preferably, the anomaly and/or fault model comprises a structure graph.

In particular, the structure graph comprises a plurality of cliques, wherein relationships between nodes of a respective clique are preferably described by a probability density function.

Relationships in respect of sensors and/or actuators of the industrial-method plant are preferably described by means of a respective clique of the structure graph.

Preferably, an anomaly is recognised if the occurrence probability of a process value in a clique of a structure graph of the anomaly and/or fault model falls below a limit value.

It may be favourable if a recognised anomaly with anomalous process variables is displayed graphically to a user.

In one embodiment of the method for anomaly and/or fault recognition, it is provided for
- the anomaly and/or fault model to comprise structural data containing information on a process structure in the industrial-method plant, and/or for
- the anomaly and/or fault model to comprise parameterisation data containing information on relationships between process values of the industrial-method plant.

The structural data in particular comprise information on relationships between sensors and/or actuators in the industrial-method plant.

The parameterisation data in particular comprise information on the occurrence probability of process values.

In particular, structural data and/or parameterisation data are utilised for generating the anomaly and/or fault model.

In one embodiment of the method for anomaly and/or fault recognition, it is provided, for the purpose of generating the anomaly and/or fault model, for one or more of the following steps to be carried out:
- structure identification for determining a process structure of the industrial-method plant;
- determination of causalities in the determined process structure of the industrial-method plant;
- structure parameterisation of the relationships in the determined process structure of the industrial-method plant.

The anomaly and/or fault model preferably comprises structure information, causality information and/or structure parameterisation information.

Preferably, the structure identification is configured to facilitate structure parameterisation.

In particular, the structure identification is configured to reduce parameterisation work and thus in particular processing work for the structure parameterisation.

In one embodiment of the method for anomaly and/or fault recognition, it is provided, in the context of structure identification for determining a process structure of the industrial-method plant, for a structure graph that in particular maps relationships in the industrial-method plant to be determined.

Preferably, the structure graph comprises a plurality of nodes and a plurality of edges connecting the nodes to one another in pairs.

Preferably, the structure graph comprises a plurality of cliques.

It may be favourable if relationships in the determined structure graph are determined by means of the structure identification.

In one embodiment of the method for anomaly and/or fault recognition, it is provided for determination of the structure graph to be performed using one or more of the following:
- a machine learning method;
- expert knowledge;
- known circuit diagrams and/or procedure diagrams;
- designations in a numbering system of the industrial-method plant.

It may be favourable if, for the purpose of structure identification, in particular for determining the structure graph, a classification comprising a numbering system (the so-called plant numbering system) is used in the industrial-method plant, for example by means of a semantic analysis.

The numbering system in particular comprises information on a functional unit, for example on the plant type of an industrial-method plant, information on a functional group of the respective functional unit, information on a functional element of the respective functional group, and/or information on a data type.

Preferably, the numbering system comprises a plurality of levels.

A first level of the numbering system comprises for example information on a respective functional unit.

A second level of the numbering system comprises for example information on a respective functional group.

A third level of the numbering system comprises for example information on a respective functional element.

A fourth level of the numbering system comprises for example information on a respective data type.

Preferably, a numbering system data set comprises unambiguous designations of the functional elements of the industrial-method plant.

For example, an unambiguous designation of a functional element comprises information on the first, second, third and/or fourth level.

Preferably, in the semantic analysis information is extracted from the numbering system data set, for example on the basis of unambiguous designations of the functional elements of the industrial-method plant.

Preferably, in the semantic analysis one or more searches of strings in a numbering system data set are carried out.

In particular, it may be provided for information to be extracted from a numbering system data set during this.

During the extraction of information, in particular a first string search in the numbering system data set is carried out, wherein in particular an extracted data set is obtained.

Information extracted from the numbering system data set is preferably categorised for semantic analysis.

In the categorisation, for example a second string search is carried out, in the extracted data set obtained during extraction of the information.

For example, it is conceivable for the particular physical variable measured by the sensor element to be identifiable during the semantic analysis, in particular with one or more string searches.

Physical variables that are identifiable by means of semantic analysis are for example the following: thermodynamic variables (temperature and/or humidity); hydraulic variables (pressure, volume and/or filling level); mechanical variables (speed of rotation, torque and/or rotational position); electrical variables (frequency, voltage, current strength and/or electrical output).

Further, it may be favourable if status variables are identifiable during the semantic analysis, in particular with one or more string searches.

Status variables that are identifiable during the semantic analysis comprise for example the following information: information on an operating state of a wetting pump (on/off); information on a manual mode for pumps (on/off); information on an opening status of a feed valve (open/closed); information on an operating state of a ventilator (on/off).

Preferably, determining the structure graph by means of a machine learning method is performed using correlation coefficients by means of which non-linear relationships are reproducible, for example by means of mutual information.

In the context of this description and the attached claims, the term "expert knowledge" is understood for example to mean knowledge of relationships between sensors in the process.

Preferably, the configuration is such that edges between nodes of the structure graph can be eliminated by a pre-configuration of the structure graph, by means of information from expert knowledge, known circuit diagrams and/or procedure diagrams. In particular here, processing work for determining the structure graph is reducible.

Process values are preferably designated unambiguously by means of the numbering system ("plant numbering system").

For this reason, it may be favourable if the structure graph is determined using the respectively unambiguous designation of the process values.

In particular, it is conceivable for the structure graph determined by means of a machine learning method to be checked for plausibility by means of expert knowledge, known circuit diagrams and/or procedure diagrams and/or the designations in the numbering system of the industrial-method plant.

In one embodiment of the method for anomaly and/or fault recognition, it is provided for the industrial-method plant to be activated by test signals for the purpose of structure identification, in particular for determining the structure graph.

Preferably, during the activation by test signals, anomalies and/or fault situations are generated deliberately.

Test signals are in particular generated taking into account technical data. In particular, limits for the test signals are predeterminable on the basis of the technical data; for example, when predetermining jump functions, a maximum amplitude is predeterminable for the control variable jumps.

In the context of this description and the attached claims, the term "technical data" is understood in particular to mean one or more of the following items of information:
- sensor type (temperature sensor, throughflow sensor, valve position sensor, pressure sensor, etc.) and/or actuator type (valve, ventilator, damper, electric motor);
- permissible value ranges of sensors and/or actuators;
- signal type of sensor and/or actuator (float, integer).

In particular, the industrial-method plant is activated dynamically by means of the test signals.

The test signals are in particular signals by means of which control variables in the industrial-method plant are modifiable. For example, control variables of valves and/or pumps of the industrial-method plant are modified by means of the test signals.

In one embodiment of the method for anomaly and/or fault recognition, it is provided for the determining of causalities in the determined process structure of the industrial-method plant to be performed using one or more of the following:

system input signals and system output signals that are generated on the activation of the industrial-method plant by test signals;
expert knowledge;
known circuit diagrams and/or procedure diagrams;
designations in a numbering system of the industrial-method plant.

Causalities in the determined process structure are derived for example from system input signals and system output signals of the industrial-method plant that are determined during activation of the industrial-method plant by test signals, for example by way of the respective temporal course of the system input signals and system output signals.

As an alternative or in addition, it is conceivable for causalities to be derived from system input signals and system output signals that are determined during activation of the industrial-method plant by test signals, by means of causal inference methods.

In the context of this description and the attached claims, the term "causalities" is understood in particular to mean directions of causality, that is to say directions marked by arrows, in the determined structure graph.

Preferably, the process values that cause a recognised anomaly are locatable by means of the causalities determined in the determined process structure or in the determined structure graph.

In one embodiment of the method for anomaly and/or fault recognition, it is provided, for the purpose of structure parameterisation of the relationships in the determined process structure of the industrial-method plant, for one or more of the following to be used:
methods for determining probability density functions, in particular Gaussian mixture models;
known physical relationships between process values;
physical characteristic diagrams of functional elements of the industrial-method plant, for example characteristic diagrams of valves.

Preferably, the structure parameterisation is performed using methods for determining probability density functions, in particular using Gaussian mixture models.

It may be favourable if relationships between two variables of the functional element are describable by physical characteristic diagrams of functional elements of the industrial-method plant.

For example, a relationship between a valve position and a volumetric flow rate is describable by a known valve characteristic diagram of a valve.

In one embodiment of the method for anomaly and/or fault recognition, it is provided for data from regular operation of the industrial-method plant and/or data obtained by activation of the industrial-method plant by test signals to be used for the purpose of structure parameterisation using methods for determining probability density functions, in particular using Gaussian mixture models.

For example, control, measurement and/or regulating variables that are stored in particular in a database are used for the purpose of structure parameterisation using methods for determining probability density functions.

Preferably, for the purpose of structure parameterisation using methods for determining probability density functions, data from ongoing operation of the industrial-method plant are used, and these are stored for a period of at least 2 weeks, preferably at least 4 weeks, for example at least 8 weeks.

In one embodiment of the method for anomaly and/or fault recognition, it is provided for the data that are used for structure parameterisation using methods for determining probability density functions, in particular using Gaussian mixture models, to be pre-processed before the structure parameterisation.

During the pre-processing, preferably data from regular operation of the plant that are not associated with operation-ready or production-ready operating states of the industrial-method plant (for example plant switched off, maintenance phases, etc.) are eliminated by way of alarms and status bits that describe the state of the industrial-method plant.

Further, it may be favourable if data from regular operation of the plant are pre-processed by filtering, for example by means of low-pass filters and/or Butterworth filters.

Preferably, data from regular operation are interpolated at a consistent time interval.

In one embodiment of the method for anomaly and/or fault recognition, it is provided during generation of the anomaly and/or fault model for a limit value for the occurrence probability of a process value to be established, wherein an anomaly is recognised if this falls below the limit value.

The limit value is preferably established in automated manner.

The limit value is preferably established by means of a non-linear optimisation method, for example by means of the Nelder-Mead method.

As an alternative or in addition, it is conceivable to establish the limit value by means of quantiles.

Limit values for the occurrence probability of the process values are preferably optimisable, for example by predetermining a false-positive rate.

Preferably, after the first generation of the anomaly and/or fault model, the limit values are adapted, in particular in the event of too high a number of false alarms.

In one embodiment of the method for anomaly and/or fault recognition, it is provided for a fault cause of a recognised anomaly and/or a recognised fault situation to be identified by means of the method for anomaly and/or fault recognition.

In particular, the fault cause is identifiable by means of the structure graph of the anomaly and/or fault model.

Preferably, the structure graph for identifying the anomaly and/or fault situation and/or for identifying the fault cause is displayed to a user.

The structure graph is configured to enable in particular a root cause analysis. In particular, anomalous process values within a process structure of the industrial-method plant are identifiable.

Preferably, a recognised anomaly is labellable by a user as a fault situation or false alarm.

Fault situations are in particular stored in a fault database.

In one embodiment of the method for anomaly and/or fault recognition, it is provided for the industrial-method plant to comprise or to be formed by one or more of the following treatment stations of a painting plant:
pre-treatment station;
station for cathodic dip coating;
drying stations;
industrial supply air plant;
painting robot.

Further, the disclosure relates to an anomaly and/or fault recognition system for recognising an anomaly and/or fault, which takes a form and is constructed to carry out the method according to examples disclosed herein for anomaly and/or fault recognition in an industrial-method plant, for example a painting plant.

The anomaly and/or fault recognition system in particular forms a message system by means of which a fault situation in the industrial-method plant is recognisable in automated manner.

Further, the disclosure relates to an industrial control system that comprises an anomaly and/or fault recognition system according to examples disclosed herein.

The method according to examples disclosed herein for anomaly and/or fault recognition preferably has individual or a plurality of the features and/or advantages described in conjunction with the method according to examples disclosed herein for fault analysis and/or the method according to examples disclosed herein for predicting process deviations.

The method according to examples disclosed herein for fault analysis and/or the method according to examples disclosed herein for predicting process deviations preferably have individual or a plurality of the features and/or advantages described in conjunction with the method according to examples disclosed herein for anomaly and/or fault recognition.

Further features and/or advantages of examples disclosed herein form the subject matter of the description below and the representation in the drawing of exemplary embodiments.

BRIEF DESCRIPTION OF THE DRAWINGS

Like or functionally equivalent elements are provided with the same reference numerals in all the Figures.

DETAILED DESCRIPTION OF THE DRAWINGS

Figure 1:
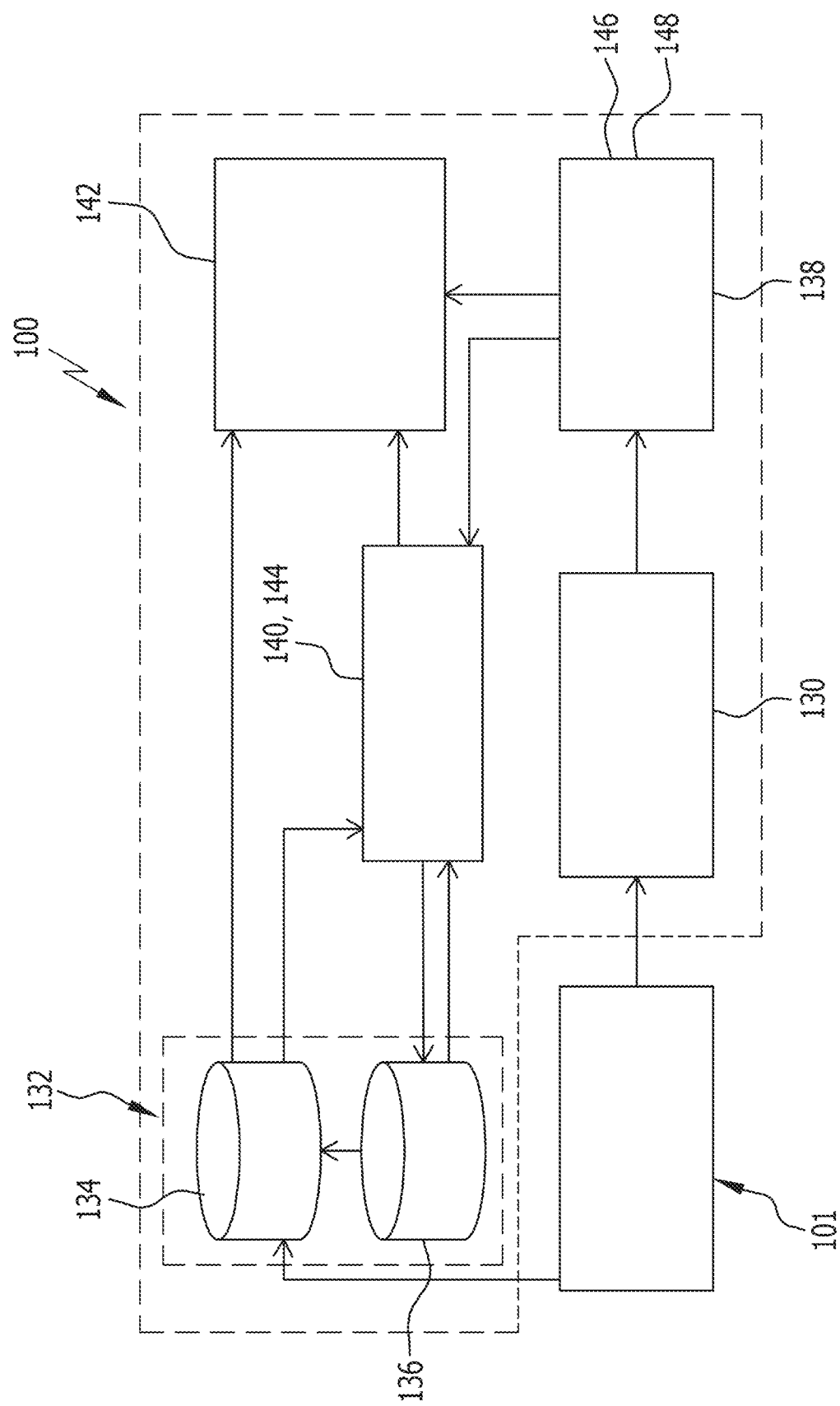
FIG. 1 shows a schematic representation of an industrial-method plant and an industrial control system.

FIG. 1 shows an industrial control system that is designated 100 as a whole, for an industrial-method plant 101.

Figure 2:
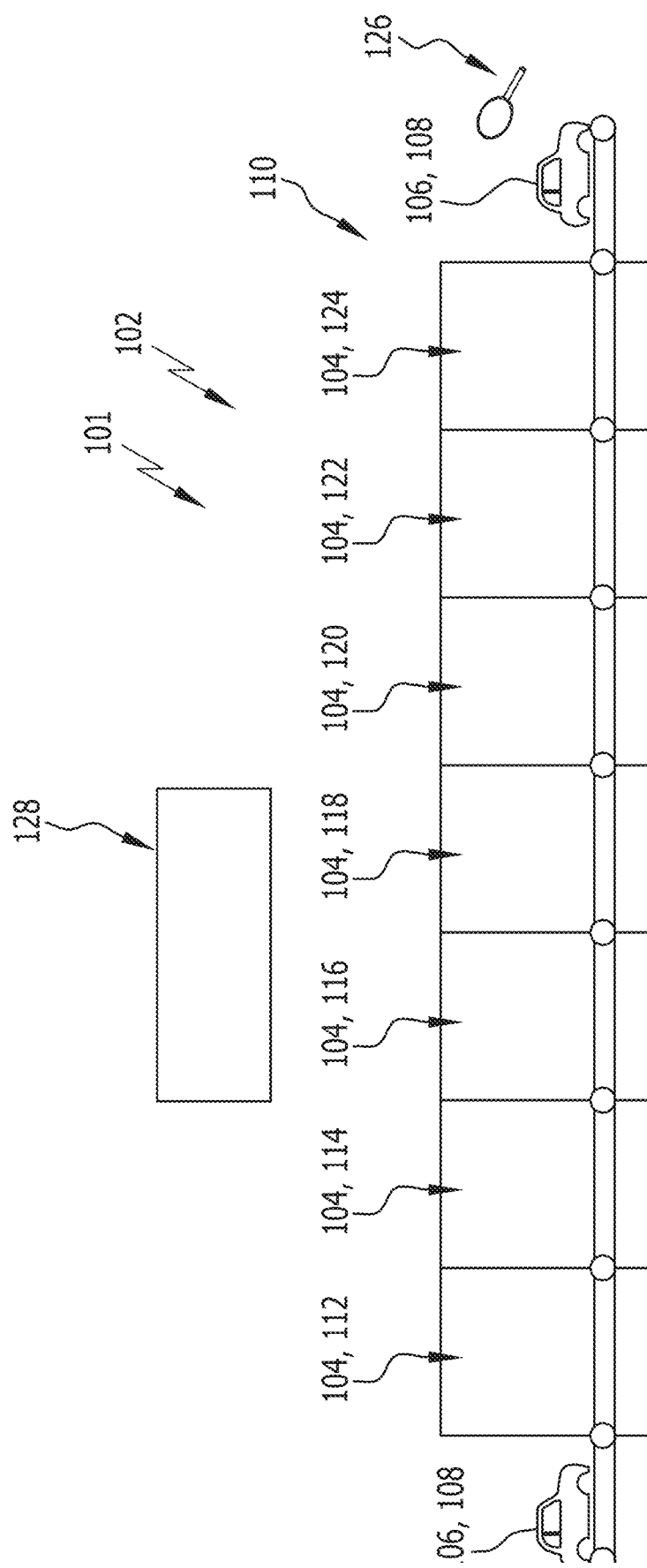
FIG. 2 shows a schematic representation of an industrial-method plant, in particular a painting plant.
Figure 3:
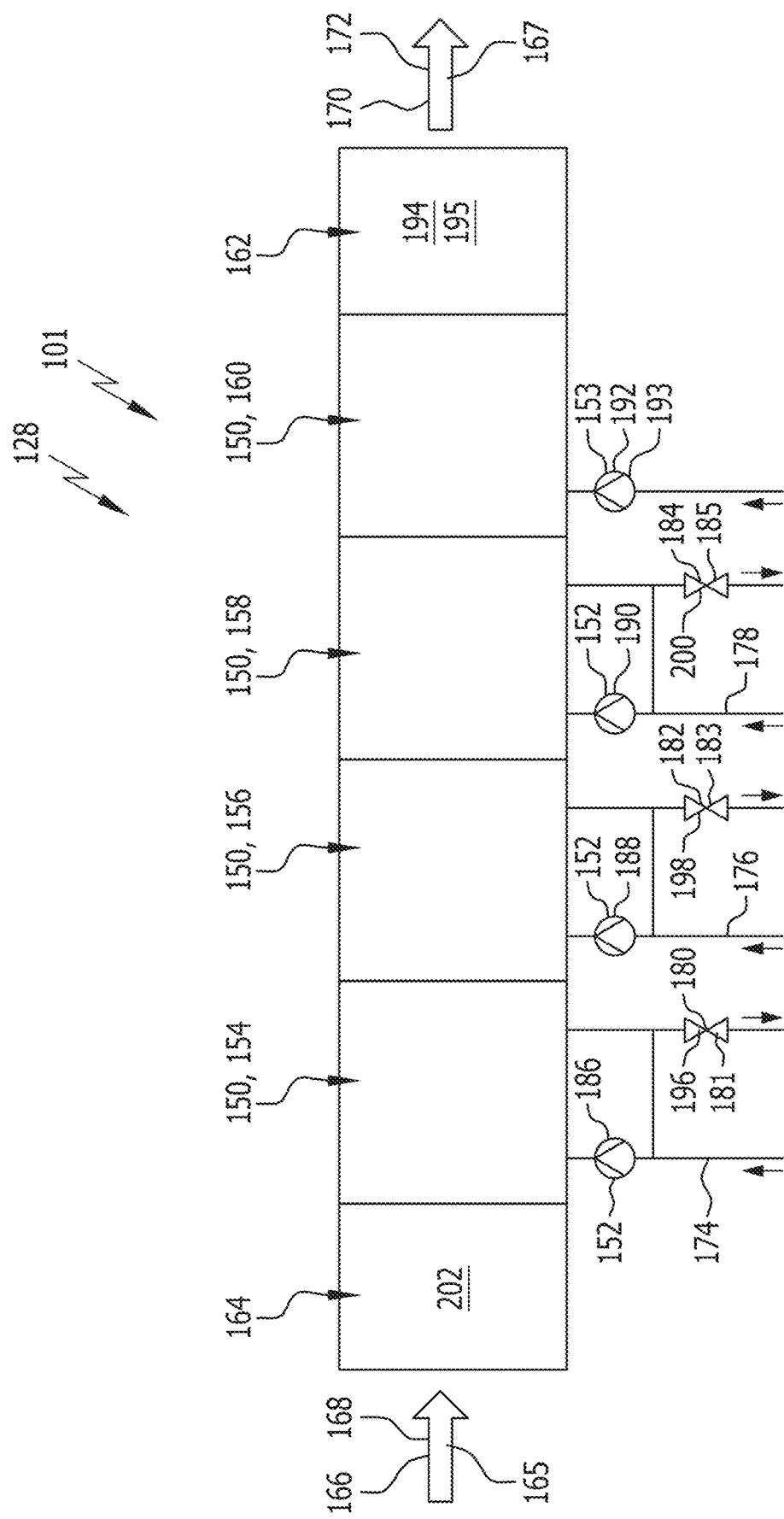
FIG. 3 shows a schematic representation of an industrial supply air plant.

The industrial-method plant 101 is for example a painting plant 104, which is illustrated in particular in FIG. 2.

In particular a method for fault analysis in the industrial-method plant 101, in particular the painting plant 102, is explained with reference to FIGS. 1 to 6.

In particular a method for predicting process deviations in the industrial-method plant 101, in particular the painting plant 102, is explained with reference to FIGS. 1, 2 and 7 to 13.

In particular a method for anomaly and/or fault recognition in the industrial-method plant 101, in particular the painting plant 102, is explained with reference to FIGS. 1, 2 and 14 to 19.

The industrial-method plant 101, in particular the painting plant 102, that is illustrated in FIG. 2 preferably comprises a plurality of treatment stations 104 for treating workpieces 106, in particular for treating vehicle bodies 108.

In the embodiment of the painting plant 102 that is illustrated in FIG. 2, the treatment stations 104 are in particular connected in a sequence and so form a painting line 110.

For the purpose of treating workpieces 106, in particular for the purpose of painting vehicle bodies 108, the workpieces 106 preferably pass through the treatment stations 104 one after the other.

For example, it is conceivable for a workpiece 106 to pass through successive treatment stations 104 in the order indicated.

A workpiece 106 is pre-treated in a pre-treatment station 112 and conveyed from the pre-treatment station 112 to a station for cathodic dip coating 114.

After the application of a coating to the workpiece 106, it is conveyed from the station for cathodic dip coating 114 to a drying station 116 downstream of the station for cathodic dip coating 114.

After drying, in the drying station 116, of the coating that was applied to the workpiece 106 in the station for cathodic dip coating 114, the workpiece 106 is preferably conveyed to a base coat booth 118, in which once again a coating is applied to the workpiece 106.

After the application of the coating in the base coat booth 118, the workpiece 106 is preferably conveyed to a base coat drying station 120.

After drying, in the base coat drying station 120, of the coating that was applied to the workpiece 106 in the base coat booth 118, the workpiece 106 is preferably conveyed to a clear coat booth 122, in which a further coating is applied to the workpiece 106.

After the application of the coating in the clear coat booth 122, the workpiece 106 is preferably conveyed to a clear coat drying station 124.

After drying, in the clear coat drying station 124, of the coating that was applied to the workpiece 106 in the clear coat booth 122, the workpiece 106 is preferably fed to an inspection station 126 at the end of the production process.

In the inspection station 126, a quality inspection is preferably carried out by a quality inspector, for example by means of a visual inspection.

The industrial-method plant 101, in particular the painting plant 102, preferably further comprises an industrial supply air plant 128 for conditioning the air that is supplied for example to the base coat booth 118 and/or the clear coat booth 122.

By means of the industrial supply air plant 128, a temperature and/or relative air humidity of the air supplied to the base coat booth 118 and/or the clear coat booth 122 is preferably adjustable.

By means of the industrial control system 100, preferably a production process, in particular a painting process, is controllable in treatment stations 104 of the industrial-method plant 101, in particular the painting plant 102.

Preferably, for this purpose the industrial control system 100 comprises a process checking system 130.

Further, the industrial control system 100 illustrated in FIG. 1 preferably comprises a database 132.

The database 132 of the industrial control system 100 preferably comprises a process database 134 and a fault database 136.

It may further be favourable if the industrial control system 100 comprises a message system 138 and an analysis system 140.

Further, the industrial control system 100 preferably comprises a display system 142 by means of which information is displayable to a user.

Preferably here, the display system 142 comprises one or more screens on which information is presentable.

The analysis system 140 preferably comprises or is formed by a fault analysis system 144.

It may further be favourable if the message system 138 comprises or is formed by a prediction system 146 for predicting process deviations in the industrial-method plant 101.

As an alternative or in addition, it is conceivable for the message system 138 to comprise an anomaly and/or fault recognition system 148.

The fault analysis system 144 in particular takes a form and is constructed to carry out methods for fault analysis in the industrial-method plant 101, which are explained with reference to FIGS. 1 to 6.

The prediction system 146 in particular takes a form and is constructed to carry out the method for predicting process deviations in the industrial-method plant 101, which are explained with reference to FIGS. 1, 2 and 7 to 13.

The anomaly and/or fault recognition system 148 is in particular constructed to carry out methods for anomaly and/or fault recognition in the industrial-method plant 101, which are explained with reference to FIGS. 1, 2 and 14 to 19.

The industrial supply air plant 128 that is illustrated in FIGS. 3 to 6 preferably comprises a plurality of conditioning modules 150, for example a pre-heating module 154, a cooling module 156, a post-heating module 158 and/or a wetting module 160.

For example, the industrial supply air plant 128 of the painting plant 102 is a functional unit, wherein a conditioning module 150 of the supply air plant 128 is a functional group and a circulation pump 152 of the supply air plant is a functional element (cf. FIGS. 3 to 6).

In addition to the circulation pumps 152 of the pre-heating module, the cooling module 156 and the post-heating module 158, the industrial supply air plant 128 preferably further comprises a wetting pump 153 of the wetting module 160.

It may further be favourable if the supply air plant 128 comprises a ventilator 162.

The supply air plant 128 preferably further comprises a heat recovery system 164 for the purpose of heat recovery.

Preferably, an air stream 165 is suppliable to the supply air plant 128 from an area surrounding it.

An air stream 167 that is conditioned by means of the supply air plant 128 is preferably suppliable to the base coat booth 118 and/or the clear coat booth 122.

Preferably, the supply air plant comprises sensors (not represented in the drawings of the Figures) by means of which process values are detectable.

For example, detectable by means of the sensors are the following process values, which are preferably respectively designated by means of a reference numeral in FIGS. 3 to 6:

external temperature 166;

external humidity 168;

temperature of the air 170 conditioned by means of the industrial supply air plant;

humidity of the air 172 conditioned by means of the industrial supply air plant;

volumetric flow rates 174, 176, 178 in the conditioning modules 150;

valve positions 180, 182, 184 of valves 181, 183, 185 in the conditioning modules 150.

Further, it may be favourable if a rotational frequency 193 of the wetting pump 153 and a rotational frequency 195 of the ventilator 194 are detected.

Preferably, the process values 166 to 184 are stored in the process database 134.

Further, it may be provided for the following status variables to be detected, which are preferably likewise respectively designated by means of a reference numeral in FIGS. 3 to 6:

pump status 186, 188, 190 of the circulation pumps 152 of the conditioning modules 150 and pump status 192 of the wetting pump 153 (on/off);

valve status 194 (on/off);

valve status 196, 198, 200 of the conditioning modules 150 (open/closed);

status 202 of the heat recovery system 164 (on/off).

Preferably, the status variables 186 to 202 are also stored in the process database 134.

The method for fault analysis in the industrial-method plant 101 is now explained preferably with reference to FIGS. 3 to 6.

Here, the industrial supply air plant 128 in particular forms the industrial-method plant 101.

Various exemplary situations are described below, from which functioning of the fault analysis system 144 can be seen.

Figure 4:
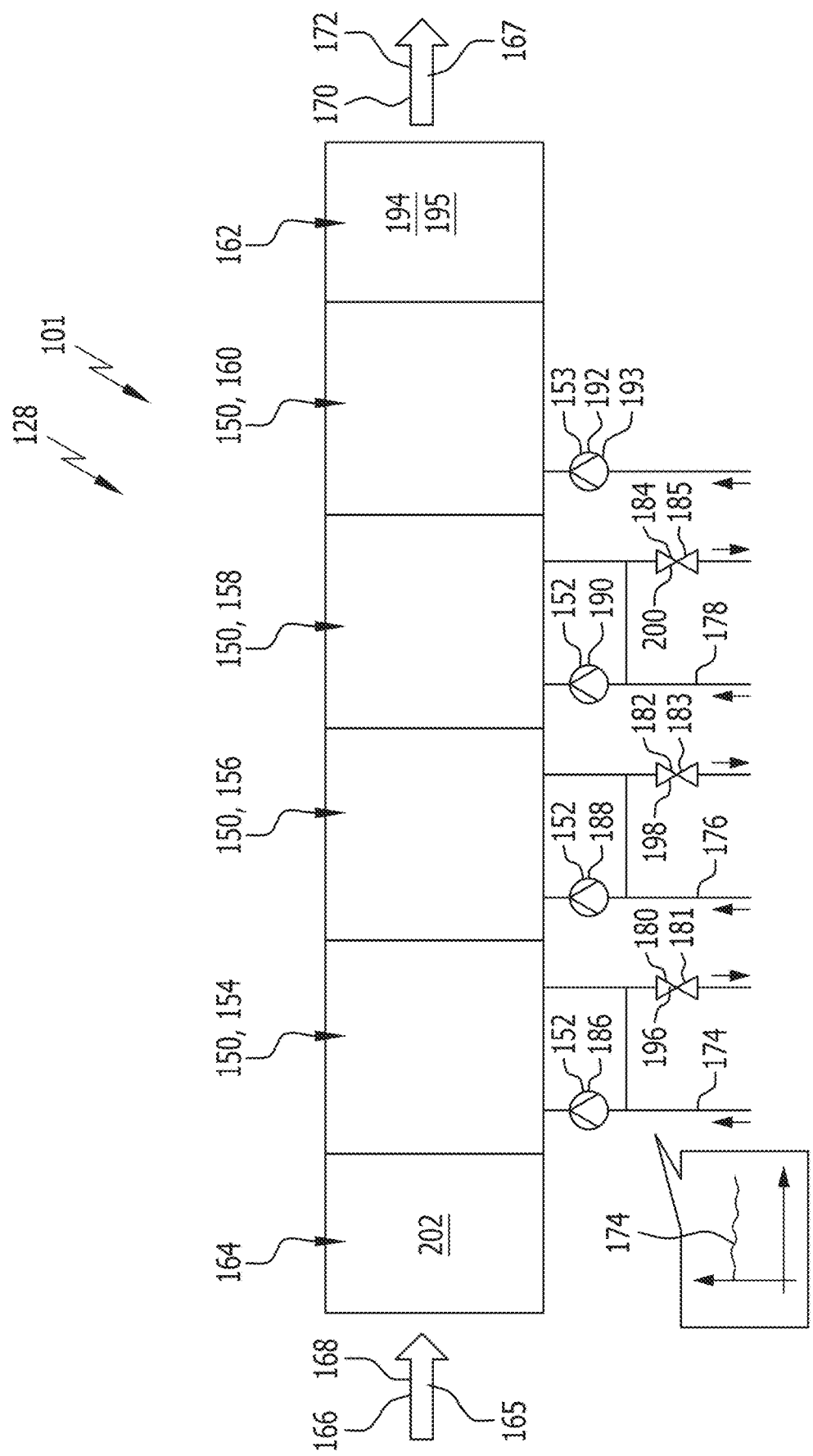
FIG. 4 shows the schematic representation of the industrial supply air plant from FIG. 3 on the occurrence of a fault situation.

Exemplary Situation 1 (cf. FIG. 4)

Valve Leak

A valve leak occurs in the pre-heating module 154. A volumetric flow rate 174 of >0 is measured. The pump status 186 is "off" and the valve status 196 of the control valve is "closed".

The fault situation is stored in the message system as an item of logic (pump status 186=off; volumetric flow rate 174>0; valve status 196 closed). Thus, the message system has preferably stored the process and status values as a prior link.

The fault analysis steps on occurrence of a message as a result of the valve leak are preferably the following:

1) The message is displayed to a user by means of the display system 142, for example by means of a screen of the display system 142.

2) A user wishes to analyse the situation, and opens a diagnostic window.

3) The process value 174 that is linked to the message and the status variables 186 and 196 are displayed to the user in the diagnostic window. Preferably, the fault analysis system 144 receives this information directly from the message system 138.

4) The process values linked to the fault situation are preferably not prioritised, since only the process value 174 is associated with the fault situation.

5) The user stores the fault situation, with the link, in the fault database 136.

6) If the fault situation "valve leak" occurs again at the same or a comparable valve, the comparable fault situation is preferably displayed to the user.

Figure 5:
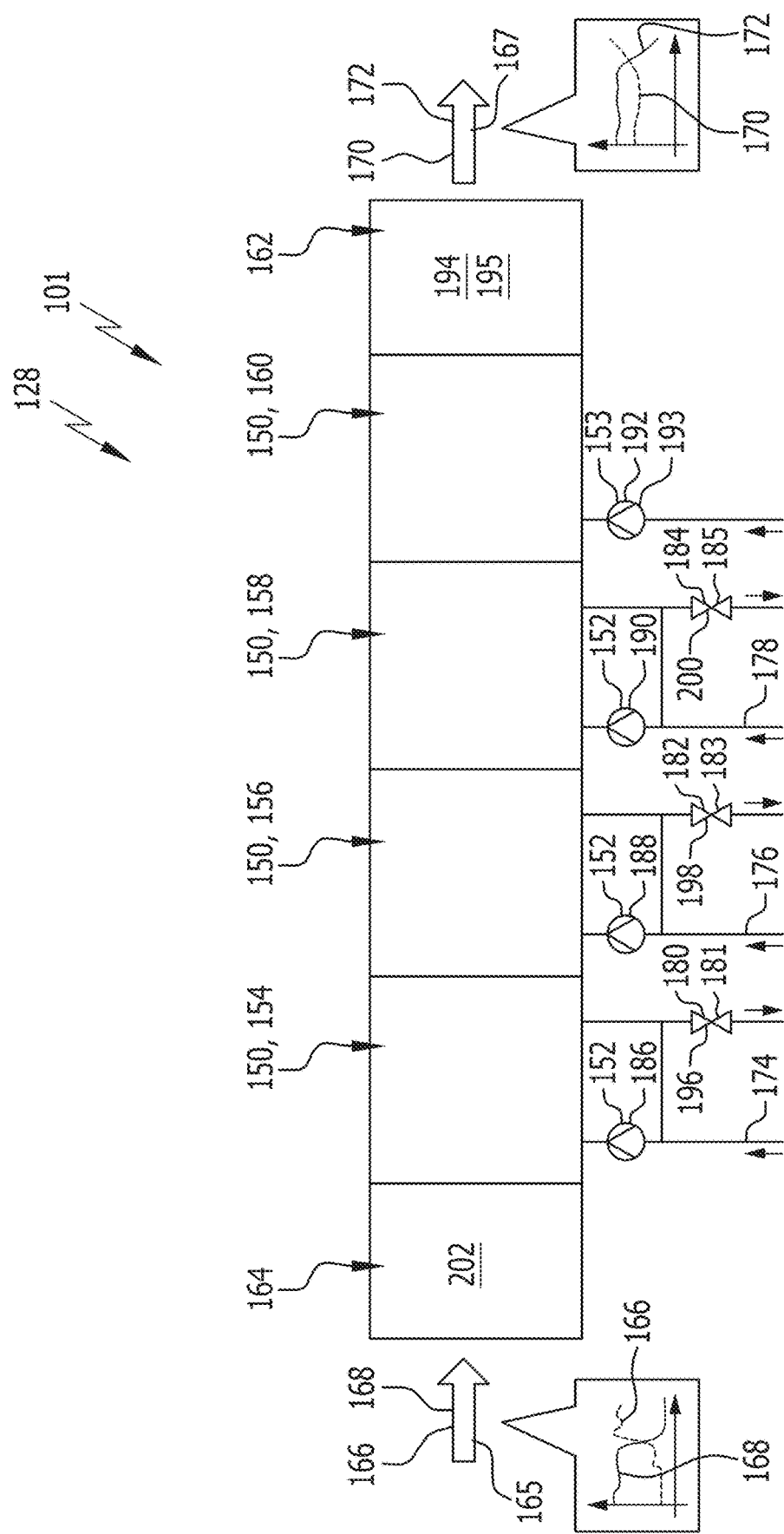
FIG. 5 shows the schematic representation of the industrial supply air plant from FIG. 3 on the occurrence of a further fault situation.

Exemplary Situation 2 (cf. FIG. 5)

Excessive Temperature 170 of the Air That is Conditioned by Means of the Industrial Supply Air Plant 128, as a Result of too High an External Temperature 166

The temperature 170 of the air that is conditioned by means of the industrial supply air plant 128 is too high, because the external temperature 166 is outside a design window of the industrial supply air plant 128.

When the temperature 170 of the air conditioned by means of the industrial supply air plant 128 departs from a predetermined process window, the message is generated and the message system 138 sends it to the display system 142.

The message is linked to the value of the temperature 170 of the air that is conditioned by means of the industrial supply air plant 128. However, the message is not linked to the external temperature 166.

The fault analysis steps when the message arises as a result of temperature change are preferably the following:

1) The message is displayed to a user by means of the display system 142, for example by means of a screen of the display system 142.

2) A user wishes to analyse the situation, and opens a diagnostic window.

3) The process value 170 that is linked to the message is displayed to the user in the diagnostic window.

4) The process values linked to the fault situation are preferably not prioritised, since only the process value 166 is associated with the fault situation.

5) The following process values are additionally preferably proposed to the user:

humidity of the air 172 conditioned by means of the industrial supply air plant (process-critical variable, displays an anomaly in behaviour);

external temperature 166 (displays an anomaly in behaviour);

external humidity 168 (displays an anomaly in behaviour).

6) The user selects the proposed process values and adds them to the fault situation.

7) The user can capture the cause of the temperature deviation directly from the analysis system 140, in particular from the fault analysis system 144, since the relevant process values are proposed to the user.

8) The user adds documentation to the fault situation, with a proposal for eliminating the fault.

9) The user stores the fault situation, with the link and the documents, in the fault database.

10) In addition to a fault ID, a fault classification (temperature increase), a fault location (exhaust part of the industrial supply air plant 128), the fault analysis system 144 preferably also captures references (IDs) of the process variables 170, 172, 166, 168 in the prioritised order and a quantity of features (such as averages, minimum, maximum, scatter of the process variables during occurrence of the fault situation) and the duration from occurrence of the fault situation until the point in time of storage or the end of the fault situation.

Exemplary Situation 3 (cf. FIG. 5)

Excessive Temperature 170 of the Air That is Conditioned by Means of the Industrial Supply Air Plant as a Result of Too High an External Temperature The temperature 170 of the air that is conditioned by means of the industrial supply air plant is again too high because of the external temperature. The fault pattern is similar to exemplary situation 2.

The analysis steps when the message arises as a result of temperature change are preferably the following:

1) The message is displayed to a user by means of the display system 142, for example by means of a screen of the display system 142.

2) The user wishes to analyse the fault situation, and opens a diagnostic window.

3) The process values 170, 172, 166, 168 that are linked to the message are displayed to the user in the diagnostic window, in the order indicated.

4) A process list and its prioritisation are produced from a similar fault situation. The similarity to the fault situation from exemplary situation 2 is determined by the fault analysis system 144 by a metric matching of the process values.

5) The similar fault situation is displayed to the user.
6) The user can utilise the courses of the process values in the prioritised order shown, and the documents of the similar fault situation displayed, in order to find a solution.
7) The user stores the fault situation.

Figure 6:
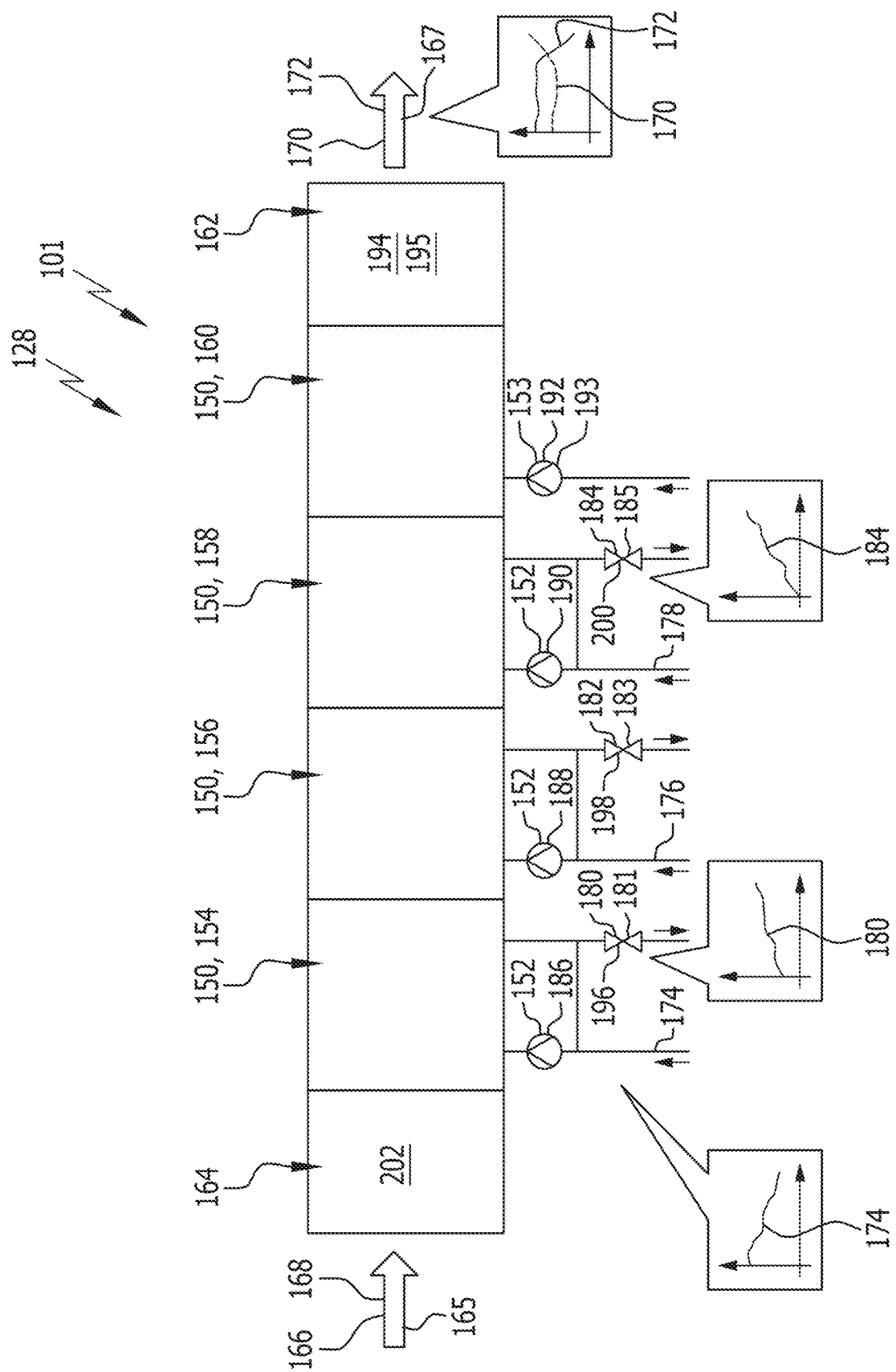
FIG. 6 shows the schematic representation of the industrial supply air plant from FIG. 3 on the occurrence of a further fault situation.

Exemplary Situation 4 (cf. FIG. 6)

Disruption in a Supply System

Too little combustion gas is supplied to a burner in the pre-heating module 154. The volumetric flow rate 174 falls.

In order to receive more combustion gas, the valve 181 of the pre-heating module 154 is opened further and the valve position 180 changes.

The valve 185 of the post-heating module 158 also opens in order to compensate for the disruption in the pre-heating module 154. The valve position 184 changes.

Because of the low external temperature 166, the disruption cannot be compensated, and the temperature 170 of the air conditioned by means of the industrial supply air plant plummets.

The analysis steps when the message arises as a result of the disruption in the supply system are preferably the following:
1) The message is displayed to a user by means of the display system 142, for example by means of a screen of the display system 142.
2) The user wishes to analyse the fault situation, and opens a diagnostic window.
3) The process value 170 that is linked to the message is displayed to the user in the diagnostic window, as a result of prior prioritisation in the message system 138.
4) No prioritisation takes place.
5) The following process values are proposed:
   humidity of the air 172 conditioned by means of the industrial supply air plant (process-critical variable, displays an anomaly in behaviour);
   volumetric flow rate 174, valve position 180, valve position 186 (dependent on deviation from normal condition).
6) The fault situations from exemplary situations 2 and 3 are not classified as similar (different signal behaviour because the metric distance between the process values is high).
7) The proposed process values can be added to the fault situation and stored in the fault database.

The method for predicting process deviations in the industrial-method plant 101 is now explained preferably with reference to FIGS. 7 to 13.

If the industrial-method plant 101 is an industrial supply air plant 128, stored process values and/or status variables preferably comprise the following (cf. FIG. 7):
  target variables 204 of the industrial supply air plant 128, in particular temperature 170 and relative air humidity 172 of the air conditioned by means of the industrial supply air plant 128, in particular at an exhaust part of the industrial supply air plant 128;
  control variables 206, in particular valve positions 180, 182, 184 of valves of heating and/or cooling modules 154, 156, 158 of the industrial supply air plant 128, rotational frequencies 193 of pumps 152, in particular the wetting pump 153, and/or rotational frequencies 195 of ventilators 162;
  internal variables 208, in particular supply and/or return flow temperatures 210 in the heating and/or cooling modules 154, 156, 158 of the industrial supply air plant 128 and/or air conditions between conditioning modules 150;
  measured disruption variables 210, in particular external temperature 166 and/or external relative air humidity 168 at an intake part of the industrial supply air plant 128;
  unmeasured disruption variables 212; and/or
  status variables 214, in particular wetting pump 153 (on/off); manual mode for pumps 152, 153 (on/off); feed valves 181, 183, 185, ventilator 162 (on/off).

Various exemplary operating states are described below, from which functioning of the prediction system 146 can be seen.

Exemplary Operating State 1

No Deviation

Figure 8:
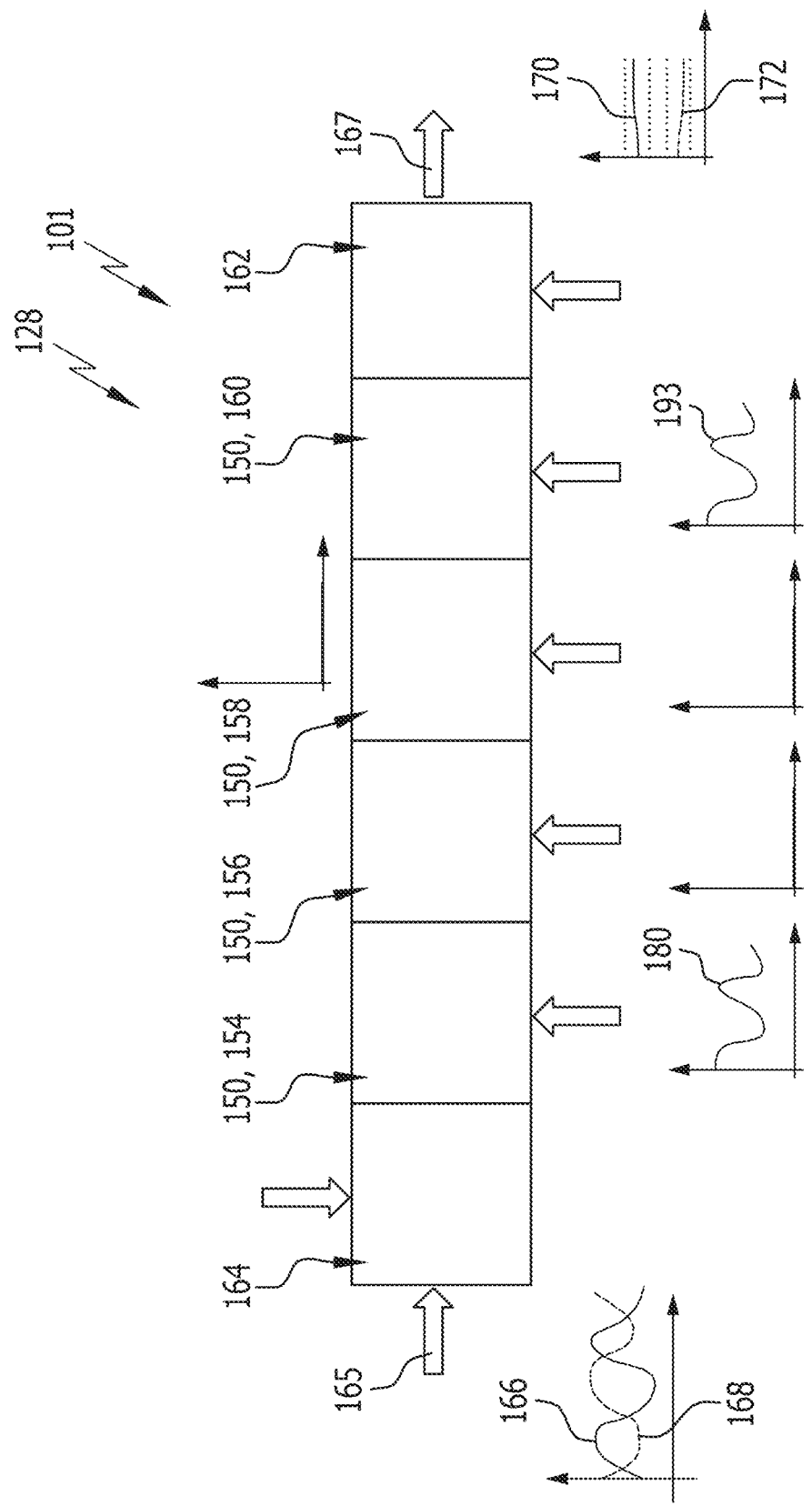
FIG. 8 shows the schematic representation of the industrial supply air plant from FIG. 7 in an operating state with no process deviation.

FIG. 8 shows a first exemplary operating state of the industrial supply air plant 128 with no process deviation. Thus, the first exemplary operating state preferably represents a positive case.

The external temperature 166 and external humidity 168 are not constant. The pre-heating module 154 and wetting module 160 are active.

A control system of the industrial supply air plant 128 keeps the temperature 170 and the relative air humidity 172 of air conditioned by means of the industrial supply air plant 128 at a constant value.

In accordance with the status variables 214 (ventilator 162=on and valve and pump mode=automatic), the industrial supply air plant 128 is operation-ready.

Further, because of the constant temperature 170 and relative air humidity 172 of the air that is conditioned by means of the industrial supply air plant 128, the industrial supply air plant 128 is preferably production-ready.

Exemplary Operating State 2

Increase in the External Temperature 166 With Fall in the External Relative Humidity 168, Above the Technical Parameters; Effect of a Measured Disruption Variable 210 on Target Variable 204

Figure 9:
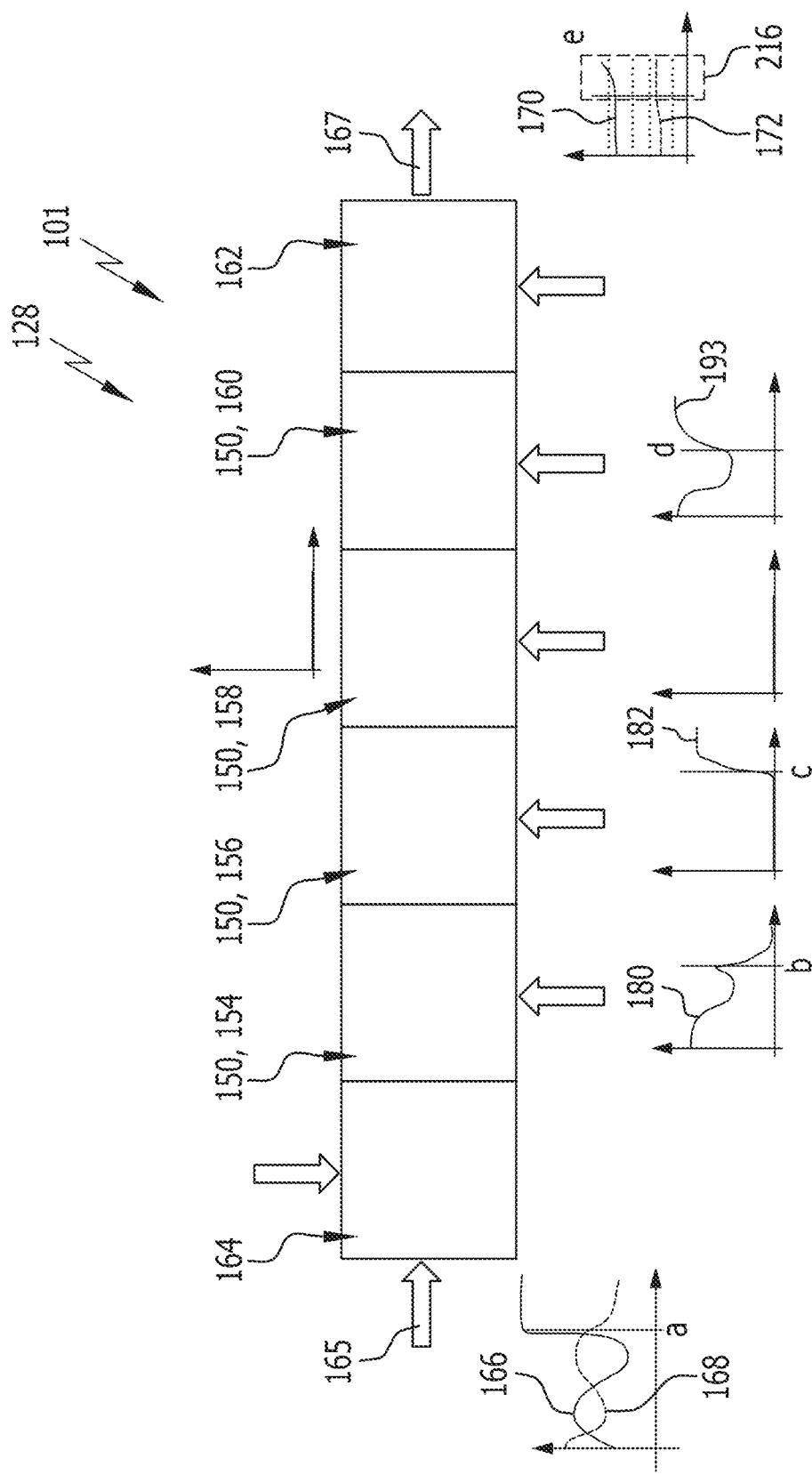
FIG. 9 shows the schematic representation of the industrial supply air plant from FIG. 7 in an operating state with a process deviation as a result of changing ambient conditions.

FIG. 9 shows a second exemplary operating state of the industrial supply air plant 128 with an increase in the external temperature 166 at the same time as a fall in the external relative humidity 168 as a result of a sudden change in the weather.

The process values display the following behaviour:
a) The increased external temperature 166 after the sudden change in the weather is outside the technical parameters.
b) The power of the previously active pre-heater module 154 is reduced by the controller.
c) Because the reduction in the heating power is not sufficient, the controller opens the valve 183 of the cooling module 156 and hence increases the cooling power.
d) The rotational frequency 193 of the wetting pump 153 is increased by the controller in order to compensate for the falling external humidity 168.
e) Because, as a result of the insufficient design of the cooling module 156, the cooling power is not sufficient, there is a deviation in the temperature 170 of the air that is conditioned by means of the industrial supply air plant 128.

A departure from the predetermined process window for the temperature 170 is delayed as a result of the inertia of the industrial supply air plant 128 and compensation by the controller.

Exemplary Operating State 3

Changeover to Winter Operation With Heat Recovery; Effect of an Unmeasured Disruption Variable 212 on Target Variable 204

Figure 10:
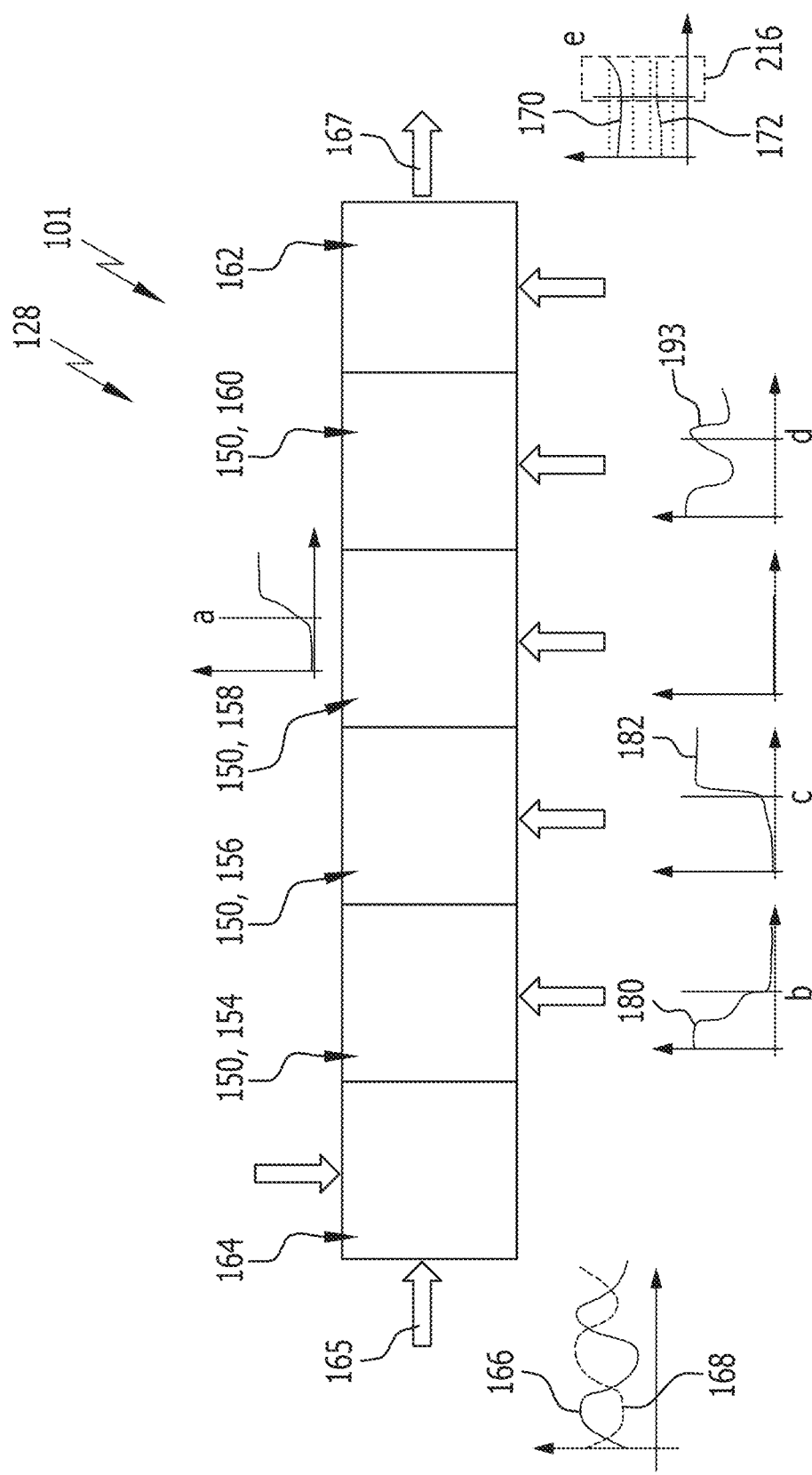
FIG. 10 shows the schematic representation of the industrial supply air plant from FIG. 7 in an operating state with a process deviation as a result of switching on a heat recovery system.

FIG. 10 shows a third exemplary operating state of the industrial supply air plant 128 when the heat recovery system 164, which uses waste heat to heat the air stream 165 in cold climatic conditions, is switched on.

The heat recovery system 164 is switched on by a manual valve, and for this reason the effect of heat recovery by the heat recovery system 164 is not measurable (unmeasured disruption variable 212).

The process values display the following behaviour:
a) The heating power of the heat recovery system 164 is increased; the value is not measurable.
b) The valve 181 of the pre-heating module 154 closes because of the increase in heating power.
c) In the cooling module 156, the valve 183 opens in order to maintain the temperature by additional cooling power.
d) The rotational frequency 193 of the wetting pump 153 is adapted by the controller such that the air humidity 172 of the air conditioned by means of the industrial supply air plant 128 is maintained.
e) There is a deviation in the temperature 170 of the air conditioned by means of the industrial supply air plant 128 because the cooling module 156 cannot compensate for the heat supply quickly enough. Because of the inertia of the industrial supply air plant 128 and compensation by the controller, the deviation occurs with a delay.

Exemplary Operating State 4

Failure of the Valve 181 of the Pre-Heating Module 154

Figure 11:
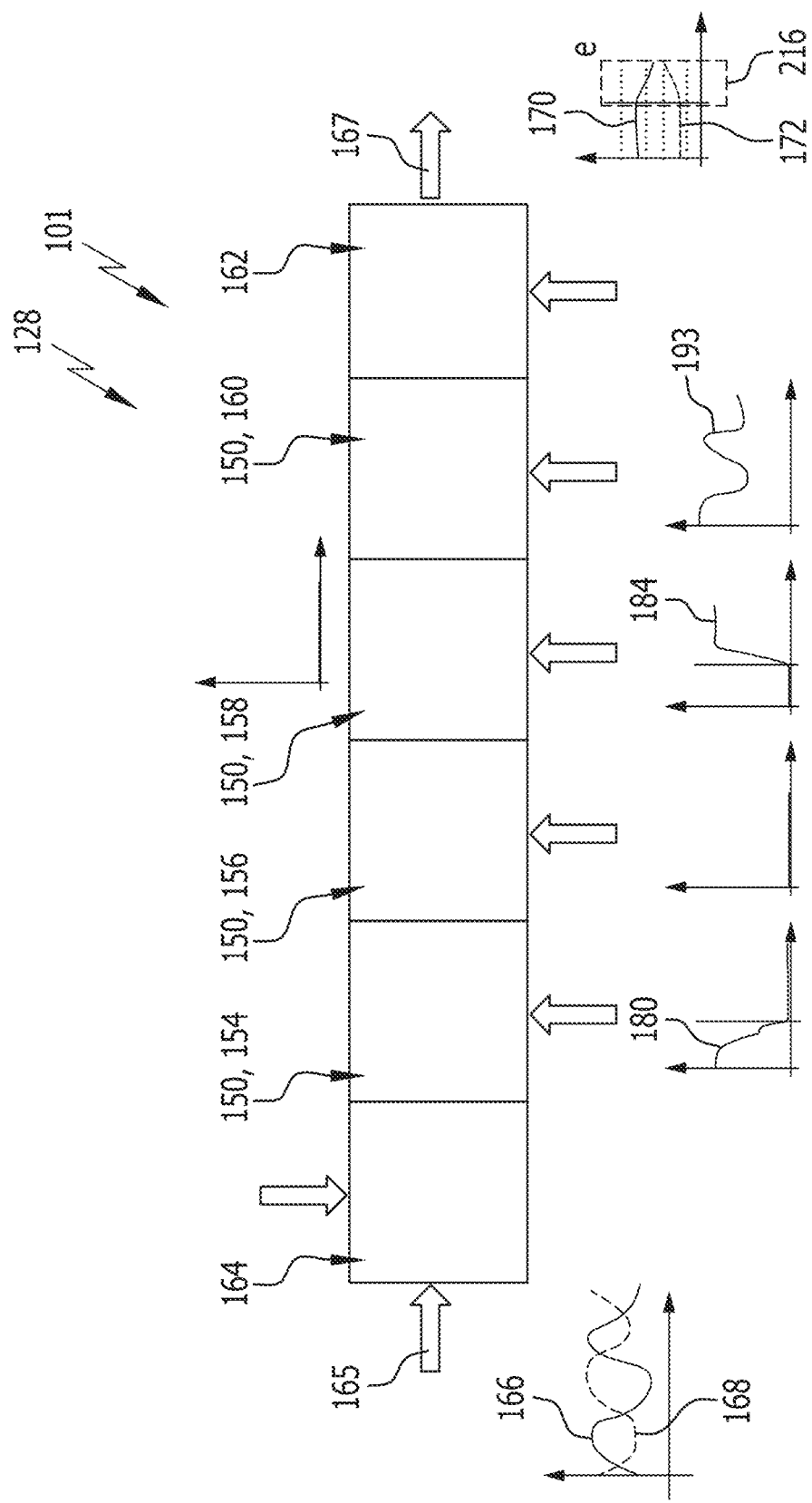
FIG. 11 shows the schematic representation of the industrial supply air plant from FIG. 7 in an operating state with a process deviation resulting from the failure of a valve.

FIG. 11 shows a fourth exemplary operating state of the industrial supply air plant 128 when there is a failure of the valve 181 of the pre-heating module 154.

The process values display the following behaviour:
a) The valve 181 of the pre-heating module 154 closes because of a device fault, as a result of which the heating power falls.
b) The valve 185 of the post-heating module 158 opens in order to compensate for the lacking heating power.
c) Because the heating power of the post-heating module 158 is not sufficient, there is a deviation in the temperature 170 of the air conditioned by means of the industrial supply air plant 128.

The method for predicting process deviations in the industrial-method plant 101, in particular in the industrial supply air plant, is explained below with reference to the operating states 1 to 4 described above.

Preferably, the operating states 2 to 4 with process deviations during operation of the industrial supply air plant 128 are predictable by means of the method for predicting process deviations with a prediction horizon 216 of for example approximately 15 minutes.

As the data basis for training a prediction model, a timespan is considered in which the industrial supply air plant 128 runs in normal operation (>80%) in an operating state that is ready for use (cf. exemplary operating state 1).

The recorded data contain the exemplary operating states 2 to 4, preferably in each case multiple times. These may have occurred in ongoing operation, or as an alternative may have been brought about deliberately, for example by closing a valve 181, 183, 185.

Figure 12:
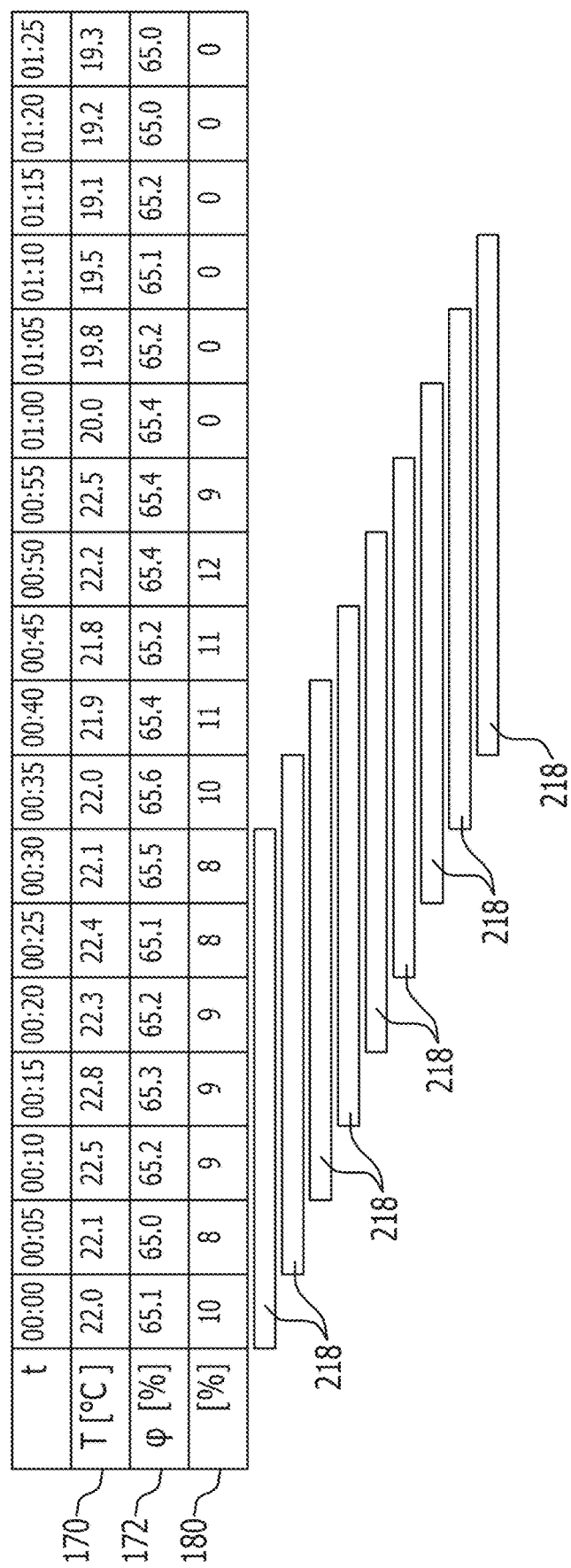
FIG. 12 shows a schematic representation of process values that are grouped into prediction data sets.
Figure 13:
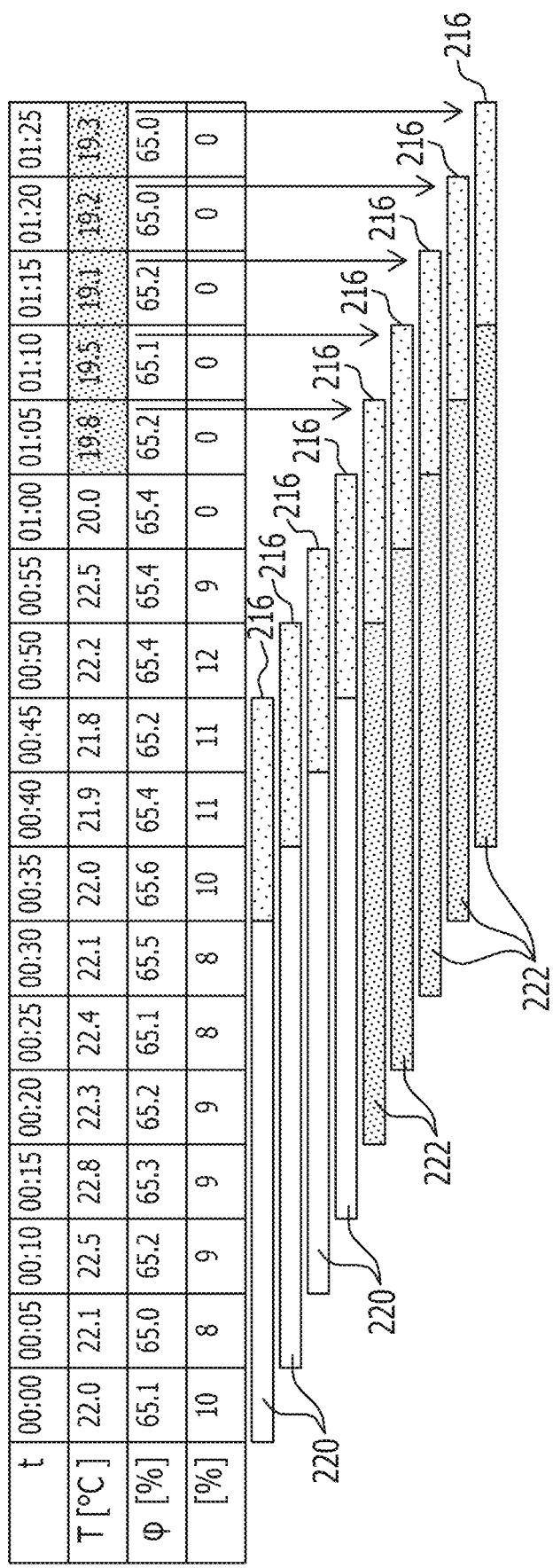
FIG. 13 shows a schematic representation of the prediction data sets from FIG. 12, which are labelled as prediction data sets with process deviations and prediction data sets with no process deviations.
Figure 14:
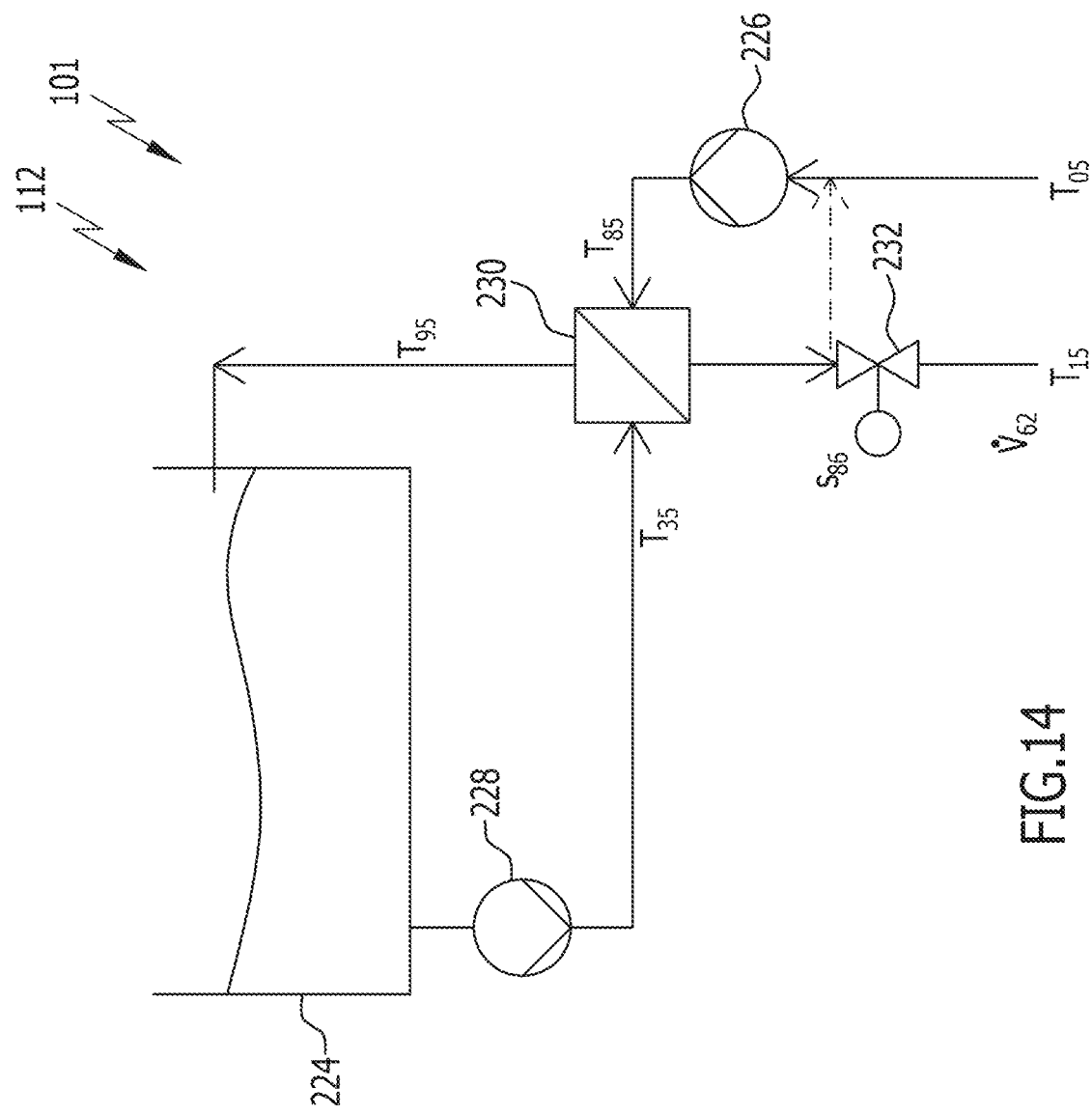
FIG. 14 shows a schematic representation of a pre-treatment station.

The data are preferably then pre-processed and regularised, as can be seen for example from FIG. 12. There, the valve position 180 of the valve 181 of the pre-heating module 154 and the temperature 170 and relative air humidity 172 of the air conditioned by means of the industrial supply air plant 128 are recorded as examples.

The regularised data are divided for example into time windows 218 of 30 minutes, in each case with a time offset of for example 5 minutes.

Figure 7:
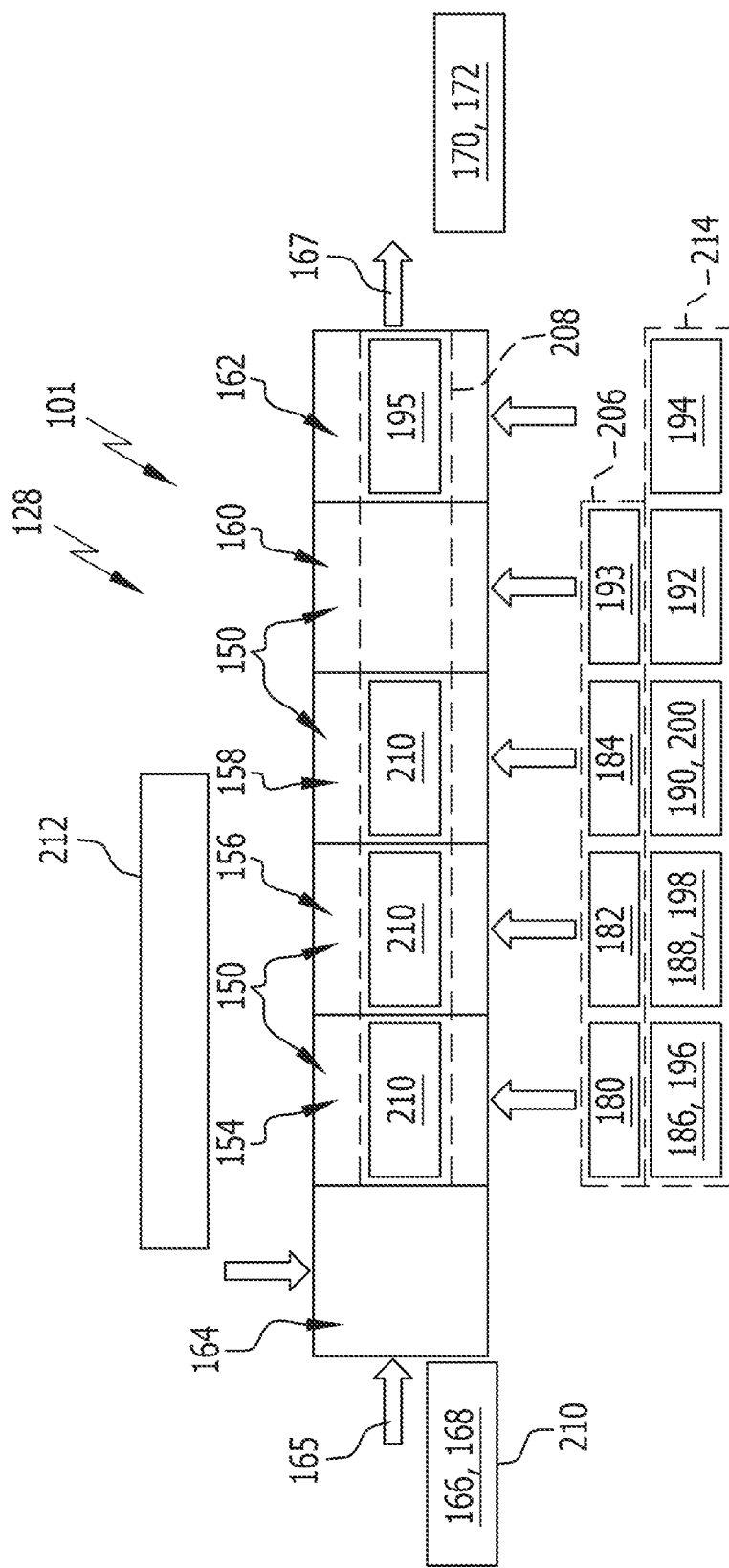
FIG. 7 shows a further schematic representation of an industrial supply air plant.

The data regularised into time windows 218 in particular form prediction data sets, in particular prediction data sets with no process deviations 220 and prediction data sets with a process deviation 222 (cf. FIG. 7).

For the prediction data sets with a process deviation 222, the status variables 214 are used to check whether the industrial-method plant 101 was operation-ready (for example, ventilator 162 on, conditioning modules 150 in automatic mode).

If not: corresponding prediction data sets with a process deviation 222 are rejected and are not used for training the prediction model.

If it was: corresponding prediction data sets with a process deviation 222 are contenders for training the prediction model.

Because of a minimum time interval of for example one hour, in FIG. 7 only one prediction data set with a process deviation 222 is selected.

Preferably, selection of the prediction data sets with no process deviations 220 is performed analogously to selection of the prediction data sets with a process deviation 222.

With a minimum time interval of for example one hour, only one prediction data set with no process deviations 220 is selected for training the prediction model.

Then, features are preferably extracted from the selected prediction data sets with no process deviations 220 and the selected prediction data sets with process deviations 222.

For the purpose of extracting the features, there are used for example statistical key figures, for example minimum, maximum, median, average and/or standard deviation. It may further be favourable if linear regression coefficients are used for extracting the features.

Preferably, the prediction model is trained on the basis of the extracted features from the selected prediction data sets with no process deviations 220 and on the basis of the selected prediction data sets with process deviations 222, in particular by means of a machine learning method, for example by means of gradient boosting.

Using the trained prediction model, process deviations of production-critical process values in the industrial supply air plant 128 are preferably predicted on the basis of changing process values during operation of the industrial supply air plant 128.

In particular, the prediction model is explained with reference to exemplary operating states 2 to 4:

Exemplary Operating State 2

The prediction model predicts a process deviation after the occurrence of an increase in temperature. The basis for this is the measured disruption variables 210, in particular external temperature 166 and external humidity 168, the response of the conditioning modules 150, and the course of the temperature 170 of the air conditioned by means of the industrial supply air plant 128 at the exhaust part.

Exemplary Operating State 3

The prediction model predicts an increase, after the heat recovery system is switched on, in the temperature 170 of the air conditioned by means of the industrial supply air plant 128. The basis is the response of the conditioning modules 150 and the course of the temperature 170 of the air conditioned by means of the industrial supply air plant 128 at the exhaust part.

Exemplary Operating State 4

The prediction model predicts an increase in the temperature 170 of the air conditioned by means of the industrial supply air plant 128, on the basis of the weather conditions and the valve position 180 of the valve 181 of the pre-heating module 156.

The method for anomaly and/or fault recognition in the industrial-method plant 101 is now explained preferably with reference to FIGS. 14 to 19.

Fault situations, in particular defects and/or failures in components, sensors and/or actuators, are preferably identifiable by means of the method for anomaly and/or fault recognition.

Here, the pre-treatment station 112 for example forms the industrial-method plant 101.

Preferably, the pre-treatment station 112 comprises a pre-treatment tank 224 in which workpieces 106, preferably vehicle bodies 108, are pre-treatable.

Preferably, the pre-treatment station 112 further comprises a first pump 226, a second pump 228, a heat exchanger 230 and a valve 232.

The process values V62dot, S86, T95, T85, T15 and T05 are given their designation on the basis of an unambiguous designation in a numbering system of the industrial-method plant 101.

The process values T95, T85, T15 and T05 represent in particular temperatures within the industrial-method plant 101, in particular within the pre-treatment station 112.

The process value S86 is a valve position of the valve 232.

The process value V62dot is a volumetric flow rate.

Figure 15:
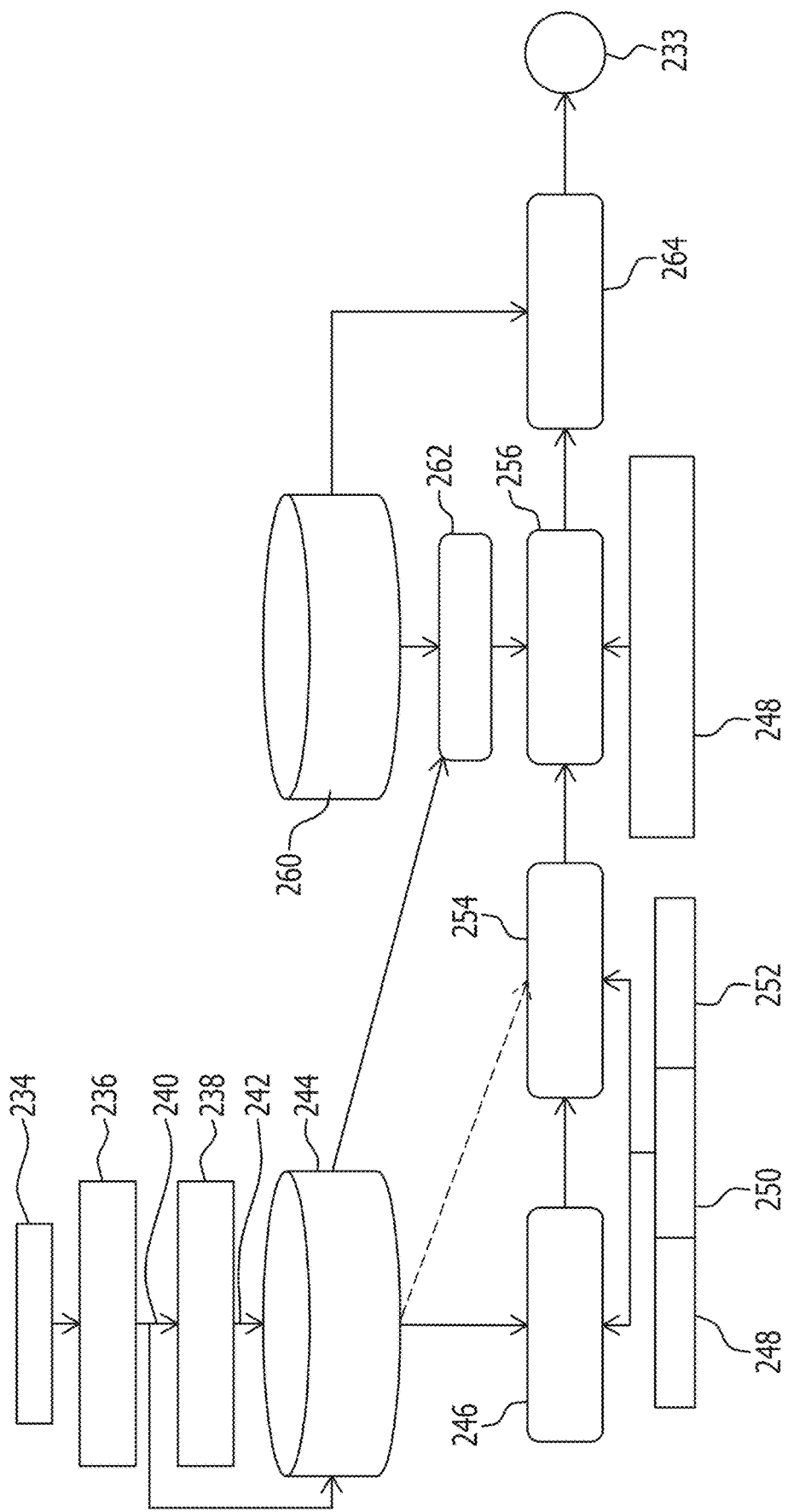
FIG. 15 shows a schematic representation of method steps for generating an anomaly and/or fault model of the pre-treatment station.
Figure 16:
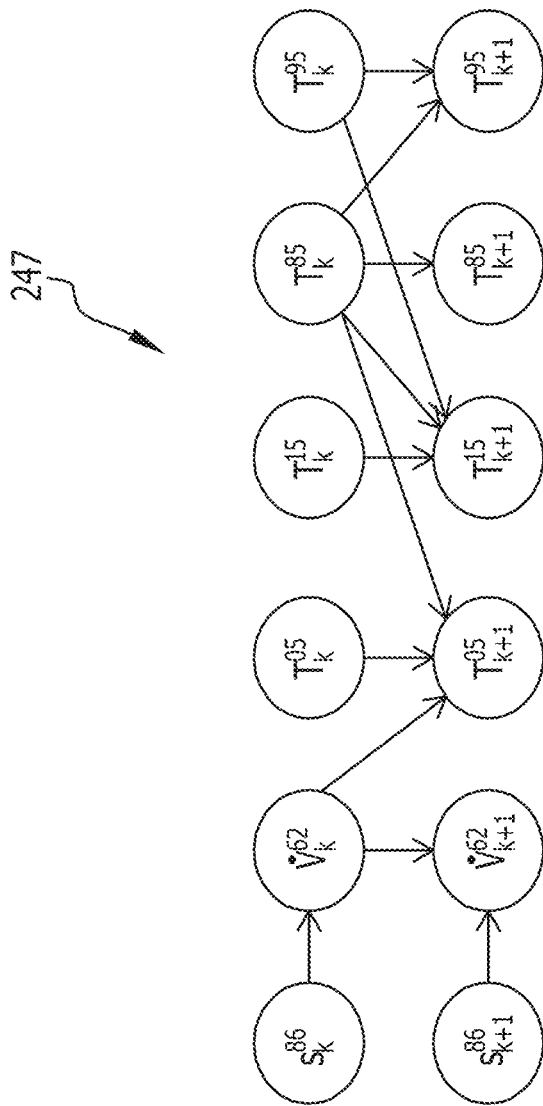
FIG. 16 shows a schematic representation of a graph having a process structure derived from the pre-treatment station from FIG. 14.

Preferably, for the purpose of carrying out the method for anomaly and/or fault recognition, an anomaly and/or fault model 233 of the industrial-method plant 101, in particular the pre-treatment station 112, is generated, comprising information on the occurrence probability of the above-mentioned process values (cf. FIG. 15).

The anomaly and/or fault model 233 is preferably generated as follows:

First, test signals are generated, in particular taking into account technical data 234 in the context of test signal generation 236.

In particular, limits for the test signals are predetermined on the basis of the technical data 234, for example, when predetermining jump functions, a maximum amplitude for control variable jumps.

The technical data 234 comprise for example one or more of the following items of information:

sensor type (temperature sensor, throughflow sensor, valve position, pressure sensor, etc.) and/or actuator type (valve, ventilator, damper, electric motor);

permissible value ranges of sensors and/or actuators;

signal type of sensor and/or actuator (float, integer).

The industrial-method plant 101, in particular the pre-treatment station 112, is preferably activated dynamically by means of the test signals. This is indicated in FIG. 15 by the reference numeral 238. Here, it is conceivable for anomalies and/or fault situations to be generated deliberately on activation with test signals.

During activation of the industrial-method plant 101, in particular the pre-treatment station 112, by test signals, preferably system input signals 240 and system output signals 242 are generated.

The system input signals 240 and system output signals 242 are preferably stored in a test signal database 244.

Then, preferably a structure identification 246 of the industrial-method plant 101, in particular the pre-treatment station 112, is carried out. Here, preferably a structure graph 247 of the industrial-method plant 101, in particular the pre-treatment station 112, is determined (cf. FIG. 16).

The structure identification 246, in particular determination of the structure graph, is preferably performed using a machine learning method, preferably using correlation coefficients by means of which non-linear relationships are reproducible, for example by means of mutual information.

It may further be favourable if, for the purpose of structure identification 246, expert knowledge 248 is used, that is to say in particular knowledge of relationships in the process.

Here, for example edges between nodes of the structure graph that is to be determined can be eliminated by a pre-configuration of the structure graph, by means of information from expert knowledge, known circuit diagrams and/or procedure diagrams 250. In particular here, processing work for determining the structure graph is reducible.

It may further be favourable if the structure graph is determined using the respectively unambiguous designation of the process values by way of a numbering system of the industrial-method plant 101, in particular the pre-treatment station 112, that is to say using semantics 252 of the designation of the process values.

In particular, it is conceivable for the structure graph that is determined by means of the machine learning method to be checked for plausibility by means of expert knowledge 248, known circuit diagrams and/or procedure diagrams 250 and/or the designations in the numbering system of the industrial-method plant 101 (semantics 252).

Preferably, causalities 254 in the determined process structure are then determined, in particular directions marked by arrows in the determined structure graph.

Causalities 254 in the determined process structure are derived for example from system input signals 240 and system output signals 242 of the industrial-method plant 101 that are determined during activation of the industrial-method plant 101 by test signals, for example by way of the respective temporal course of the system input signals 240 and system output signals 242.

As an alternative or in addition, it is conceivable for causalities 254 to be derived from system input signals 240 and system output signals 242 that are determined during activation of the industrial-method plant 101 by test signals, by means of causal inference methods.

For determining the causalities 254, there are further preferably used expert knowledge 248, procedure diagrams 250 and/or the designations in the numbering system of the industrial-method plant 101 (semantics 252).

Preferably, the process values that cause a recognised anomaly are locatable by means of the causalities 254 determined in the determined process structure or in the determined structure graph.

After the structure identification 246 and/or determination of the causalities 254, preferably a structure parameterisation 256 is carried out.

Preferably, the structure identification 246 is configured to facilitate structure parameterisation 256. Preferably, the structure identification 246 is configured to reduce processing work for the structure parameterisation 256.

Preferably, the structure parameterisation 256 is performed using a method for determining probability density functions, in particular using Gaussian mixture models.

Figure 17:
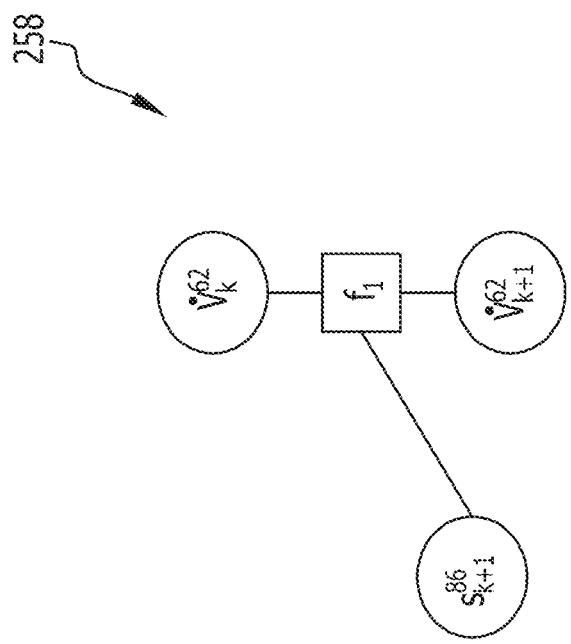
FIG. 17 shows a clique of a factor graph.
Figure 18:
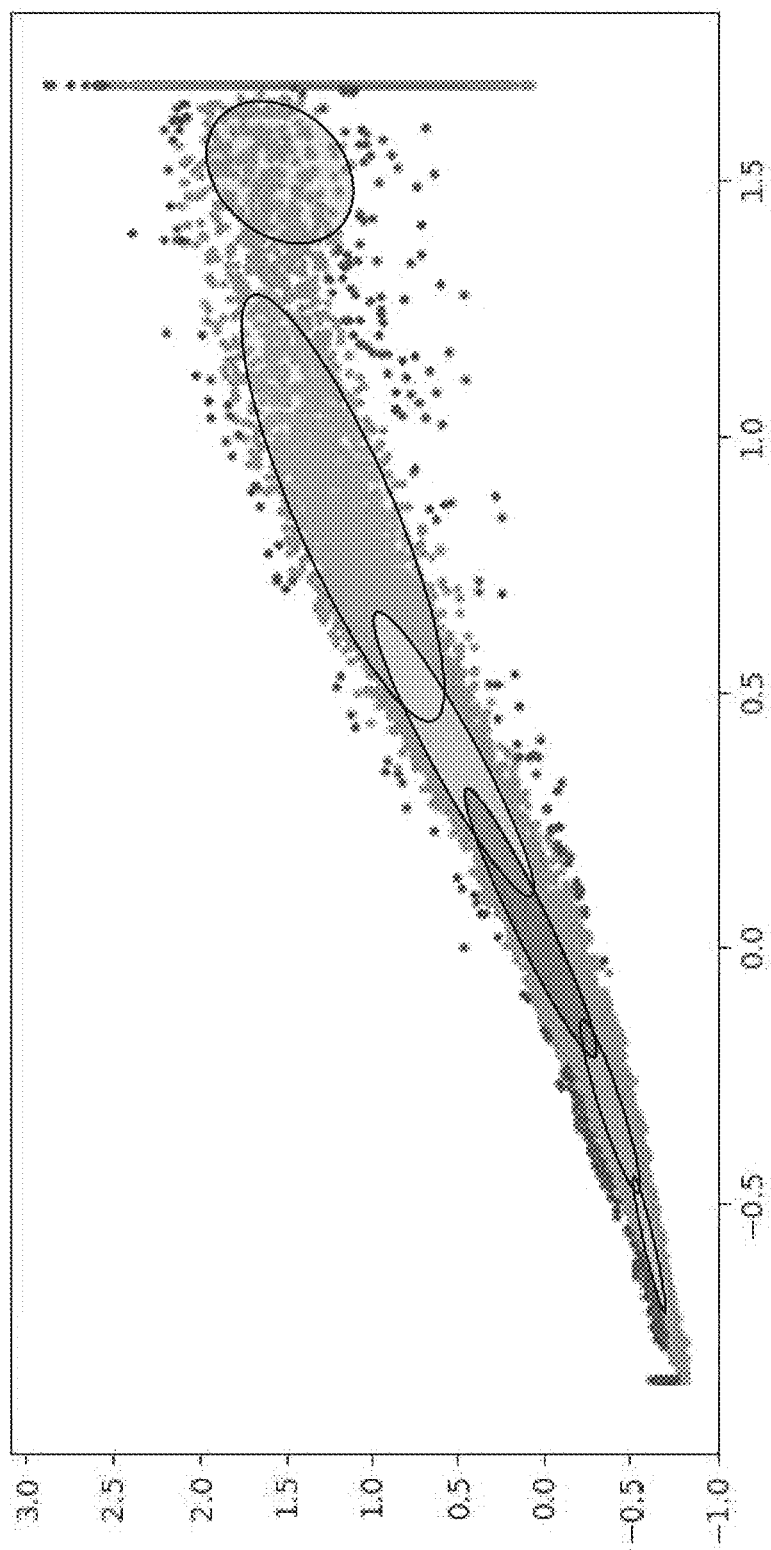
FIG. 18 shows a model of a functional relationship in the clique from FIG. 17.

The structure parameterisation 256 is carried out for example for the common probability density function f1 of the clique 258 represented in FIG. 17 using Gaussian mixture models (cf. FIG. 18).

Preferably, expert knowledge 248 is likewise used for the structure parameterisation 256.

For the purpose of structure parameterisation 256, for example known physical relationships between process values and/or physical characteristic diagrams of functional elements of the industrial-method plant 101, in particular the pre-treatment station, are used. For example, a characteristic diagram of the valve 232 is used.

It may further be favourable if expert knowledge 248 on fault situations is used for structure parameterisation 256.

For example, a relationship between the valve position S86 and the volumetric flow rate V62dot is describable by means of a known valve characteristic diagram of the valve 232.

Data that are stored in an operations database 260 from regular operation of the industrial-method plant 101, in particular the pre-treatment station 112, and/or data from the test signal database 244 are preferably used for the purpose of structure parameterisation 256 using methods for determining probability density functions, in particular using Gaussian mixture models.

For example, control, measurement and/or regulating variables that are stored in particular in a database 244, 260 are used for the purpose of structure parameterisation 256 using methods for determining probability density functions.

Preferably, for the purpose of structure parameterisation 256 using methods for determining probability density functions, data from ongoing operation of the industrial-method plant 101, in particular the pre-treatment station, are used, and these are stored for a period of at least 2 weeks, preferably at least 4 weeks, for example at least 8 weeks.

The data are preferably pre-processed before the structure parameterisation 256.

During the pre-processing, preferably data from the industrial-method plant 101 that are not associated with operation-ready or production-ready operating states of the industrial-method plant 101 (for example plant switched off, maintenance phases, etc.) are eliminated in particular by way of alarms and status bits that describe the state of the industrial-method plant 101, in particular the pre-treatment station 112.

Further, it may be favourable if data from the industrial-method plant 101 are pre-processed by filtering, for example by means of low-pass filters and/or Butterworth filters.

Preferably, the data are further interpolated at a consistent time interval.

During generation of the anomaly and/or fault model 233, a limit value for the occurrence probability of a process value is preferably established in the context of a limit value optimisation 264.

The limit value for the occurrence probability is preferably established such that if this falls below the limit value an anomaly is recognised.

The limit value is preferably established by means of a non-linear optimisation method, for example by means of the Nelder-Mead method.

As an alternative or in addition, it is conceivable to establish the limit value by means of quantiles.

Limit values for the occurrence probability of the process values are preferably optimisable, for example by predetermining a false-positive rate.

Further, it is conceivable for the limit values to be adapted after the first generation of the anomaly and/or fault model 233, in particular in the event of too high a number of false alarms.

Preferably, anomaly and/or fault recognition is performed using the anomaly and/or fault model 233 as follows:

For example, the valve 232 undergoes valve failure and thus the sensor values deviate from the mapped normal condition in the individual cliques.

The occurrence probabilities of the sensor values in the cliques are evaluated during operation of the industrial-method plant 101, in particular of the pre-treatment station 112, and if they fall below the calculated limit values anomalies are detected in the different cliques.

Valve failure of the valve 232 results initially in an anomaly in the clique 258 of the valve position S86, wherein a message is output by the anomaly and/or fault recognition system 148.

As time continues, as a result of fault propagation further anomalies are produced, which later also affect the process-relevant variable, for example the tank temperature T35 of the tank 224.

Preferably, the message from the anomaly and/or fault recognition system 148 contains one or more of the following items of information:

point in time at which the anomaly was detected;

clique(s) in which the anomaly occurred, with sensors affected.

As a result of early recognition of the anomaly and the message to the user, with prompt intervention it is preferably possible to prevent deviation of the process-relevant variable, that is to say the tank temperature T35 of the tank 224.

The user can then define a cause of the fault (that is to say the valve failure) for occurrence of the anomaly.

Figure 19:
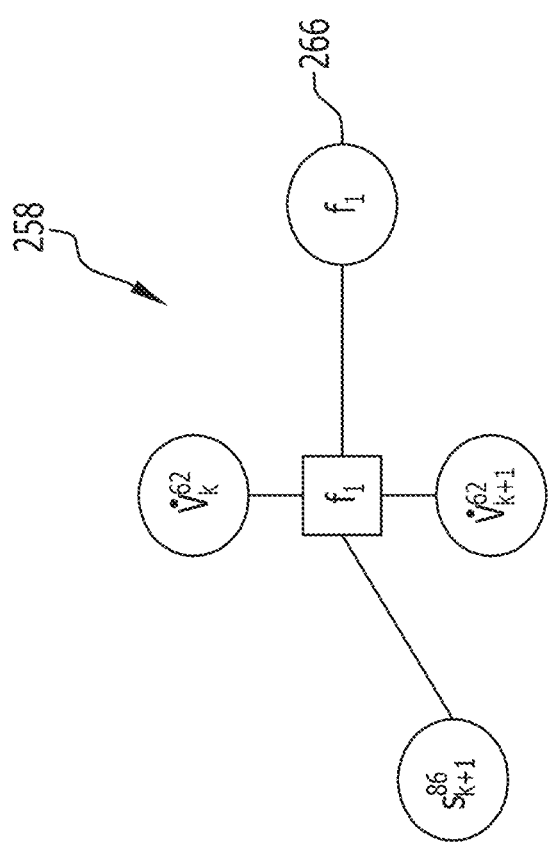
FIG. 19 shows a clique corresponding to the clique from FIG. 17, which has been expanded by one node by allocating a fault cause.

As a result of allocating the fault cause, the clique 258 is expanded by one node 266 and the probability density function of the anomalous data is integrated into the functional relationship (cf. FIG. 19).

After integration of the fault cause, the method for anomaly and/or fault recognition is carried out as before. If an anomaly occurs, the probabilities of the defined fault causes are additionally output.

As a result of the message from the anomaly and/or fault recognition system 148, a user now receives one or more of the following items of information:
- point in time at which the anomaly was detected;
- clique(s) in which the anomaly occurred, with sensors affected;
- probabilities of the defined fault causes.

Particular embodiments are the following:

Embodiment 1

A method for fault analysis in an industrial-method plant (101), for example a painting plant (102), wherein the method comprises the following:
- in particular automatic recognition of a fault situation in the industrial-method plant (101);
- storage of a fault situation data set for the respective recognised fault situation, in a fault database (136);
- automatic determination of a cause of the fault for the fault situation and/or automatic determination of process values that are relevant to the fault situation, on the basis of the fault data set of a respective recognised fault situation.

Embodiment 2

A method according to embodiment 1, characterised in that, for the purpose of automatically determining the fault cause for the fault situation and/or automatically determining the process values relevant to the fault situation, one or more process values are automatically linked to the fault situation on the basis of one or more of the following link criteria:
- prior linking from a message system;
- an association of a process value with the same part of the industrial-method plant (101) as that in which the fault situation occurred;
- linking a process value to a historical fault situation on the basis of active selection by a user;
- an active selection of the process value by a user.

Embodiment 3

A method according to embodiment 2, characterised in that, for the purpose of automatically determining the fault cause for the fault situation and/or automatically determining the process values relevant to the fault situation, automatic prioritisation of the process values linked to the fault situation is carried out automatically on the basis of one or more of the following prioritisation criteria:
- a process relevance of the process values;
- a position of a process value or of a sensor determining the process value within the industrial-method plant (101);
- an amount by which a process value deviates from a defined process window and/or a normal condition;
- a prioritisation of historical process values in historical fault situations;
- by adopting a prioritisation of the fault cause and/or the process values from a message system (138);
- a prioritisation by a user.

Embodiment 4

A method according to one of embodiments 1 to 3, characterised in that, for the purpose of automatically determining the fault cause for the fault situation and/or automatically determining the process values relevant to the fault situation, further fault causes and/or process values are proposed, wherein the proposal is made automatically on the basis of one or more of the following proposal criteria:
- a process relevance of the process values;
- a position of a process value or of a sensor determining the process value within the industrial-method plant (101);
- an amount by which a process value deviates from a defined process window and/or a normal condition;
- a prioritisation of historical process values in historical fault situations;
- physical dependences of the process values.

Embodiment 5

A method according to one of embodiments 1 to 4, characterised in that historical fault situations are determined from a fault database (136) using one or more of the following similarity criteria:
- a fault classification of the historical fault situation;
- a historical fault situation in the same or a comparable plant part;
- process values of the historical fault situation that are identical or similar to process values of the recognised fault situation.

Embodiment 6

A method according to one of embodiments 1 to 5, characterised in that historical process values that are identical or similar to process values of the recognised fault situation are determined from a process database (134).

Embodiment 7

A method according to embodiment 6, characterised in that the determined historical process values are characterised as belonging to a historical fault situation.

Embodiment 8

A method according to one of embodiments 1 to 7, characterised in that, for a recognised fault situation, a fault situation data set is stored in a fault database (136).

Embodiment 9

A method according to embodiment 8, characterised in that a respective fault identification data set comprises one or more of the following fault situation data:
- a fault classification of the fault situation;
- process values that are linked to the fault situation, based on a prior linking from a message system;
- information on a point in time at which a respective fault situation occurred;
- information on a duration for which a respective fault situation occurred;
- information on the location in which a respective fault situation occurred;
- alarms;
- status messages.

Embodiment 10

A method according to embodiment 8 or 9, characterised in that the fault situation data set of a respective fault situation comprises fault identification data for unambiguous identification of the recognised fault situation.

Embodiment 11

A method according to one of embodiments 8 to 10, characterised in that documentation data and fault elimination data are stored in the fault situation data set of a respective fault situation.

Embodiment 12

A method according to one of embodiments 8 to 11, characterised in that process values are stored during operation of the industrial-method plant (101), synchronised with a recognised fault situation.

Embodiment 13

A method according to one of embodiments 8 to 12, characterised in that process values are provided with a time stamp by means of which the process values are configured to be unambiguously associated with a point in time.

Embodiment 14

A fault analysis system (144) for fault analysis in an industrial-method plant (101), for example a painting plant (102), wherein the system takes a form and is constructed for the purpose of carrying out the method for fault analysis in an industrial-method plant (101), for example a painting plant (102), according to one of embodiments 1 to 13.

Embodiment 15

An industrial control system (100) that comprises a fault analysis system (144) according to embodiment 14.

Embodiment 16

A method for predicting process deviations in an industrial-method plant (101), for example a painting plant (102), wherein the method comprises the following:
automatic generation of a prediction model;
prediction of process deviations during operation of the industrial-method plant (101), using the prediction model.

Embodiment 17

A method according to embodiment 16, characterised in that the method for predicting process deviations is carried out in an industrial supply air plant (128), a pre-treatment station (112), a station for cathodic dip coating (114) and/or a drying station (116, 120, 124).

Embodiment 18

A method according to embodiment 16 or 17, characterised in that process deviations of production-critical process values in the industrial-method plant (101) are predicted by means of the prediction model, on the basis of changing process values during operation of the industrial-method plant (101).

Embodiment 19

A method according to one of embodiments 16 to 18, characterised in that, for the purpose of automatically generating the prediction model, process values and/or status variables are stored during operation of the industrial-method plant (101) for a predetermined period.

Embodiment 20

A method according to embodiment 19, characterised in that the predetermined period for which process values and/or status variables are stored during operation of the industrial-method plant (101) is predetermined in dependence on one or more of the following criteria:
the industrial-method plant (101) is in an operation-ready state, in particular for a production operation, for at least approximately 60%, preferably for at least approximately 80%, of the predetermined period;
the industrial-method plant (101) is in a production-ready state for at least approximately 60%, preferably for at least approximately 80%, of the predetermined period;
during the predetermined period, the industrial-method plant (101) is operated in particular using all possible operating strategies;
a predetermined number of process deviations and/or disruptions in the predetermined period.

Embodiment 21

A method according to embodiment 19 or 20, characterised in that, for the purpose of generating the prediction model, a machine learning method is carried out, wherein the process values and/or status variables that are stored for the predetermined period are used for generating the prediction model.

Embodiment 22

A method according to embodiment 21, characterised in that the machine learning method is carried out on the basis of features that are extracted from the process values and/or status variables stored for the predetermined period.

Embodiment 23

A method according to embodiment 22, characterised in that one or more of the following is used for the purpose of extracting features:
statistical key figures;
coefficients from a principal component analysis;
linear regression coefficients;
dominant frequencies and/or amplitudes from the Fourier spectrum.

Embodiment 24

A method according to one of embodiments 16 to 23, characterised in that a selected number of prediction data sets with process deviations (222) and a selected number of prediction data sets with no process deviations (220) are used for training the prediction model.

Embodiment 25

A method according to embodiment 24, characterised in that selection of the number of prediction data sets with a process deviation is made on the basis of one or more of the following criteria:

a minimum time interval between two prediction data sets with process deviations;

an automatic selection on the basis of defined rules;

a selection by a user.

Embodiment 26

A method according to embodiment 24 or 25, characterised in that prediction data sets with process deviations are characterised as such if a process deviation occurs within a predetermined time interval.

Embodiment 27

A method according to embodiment 26, characterised in that the process values and/or status variables that are stored for the predetermined period are grouped into prediction data sets by pre-processing.

Embodiment 28

A method according to embodiment 27, characterised in that the pre-processing comprises the following:

regularisation of the process values stored for the predetermined period;

grouping the process values and/or status variables into prediction data sets by classifying the process values and/or status variables into time windows with a time offset.

Embodiment 29

A prediction system (146) for predicting process deviations in an industrial-method plant, wherein the prediction system takes a form and is constructed for the purpose of carrying out the method for predicting process deviations in an industrial-method plant (101), for example a painting plant (102), according to one of embodiments 16 to 29.

Embodiment 30

An industrial control system (100) that comprises a prediction system (146) according to embodiment 29.

Embodiment 31

A method for anomaly and/or fault recognition in an industrial-method plant (101), for example a painting plant (102), wherein the method comprises the following:

automatic generation of an anomaly and/or fault model (233) of the industrial-method plant (101) that comprises information on the occurrence probability of process values;

automatic input of process values of the industrial-method plant (101) during operation thereof;

automatic recognition of an anomaly and/or fault situation by determining an occurrence probability by means of the anomaly and/or fault model (233) on the basis of the process values of the industrial-method plant (101) that have been input and by checking the occurrence probability for a limit value.

Embodiment 32

A method according to embodiment 31, characterised in that the anomaly and/or fault model (233) comprises structural data containing information on a process structure in the industrial-method plant (101), and/or in that the anomaly and/or fault model (233) comprises parameterisation data containing information on relationships between process values of the industrial-method plant (101).

Embodiment 33

A method according to embodiment 31 or 32, characterised in that, for the purpose of generating the anomaly and/or fault model (233), one or more of the following steps is carried out:

structure identification (246) for determining a process structure of the industrial-method plant (101);

determination of causalities (254) in the determined process structure of the industrial-method plant (101);

structure parameterisation (256) of the relationships in the determined process structure of the industrial-method plant (101).

Embodiment 34

A method according to embodiment 33, characterised in that, in the context of structure identification (246) for determining a process structure of the industrial-method plant (101), a structure graph that in particular maps relationships in the industrial-method plant (101) is determined.

Embodiment 35

A method according to embodiment 34, characterised in that determination of the structure graph is performed using one or more of the following:

a machine learning method;

expert knowledge (248);

known circuit diagrams and/or procedure diagrams (250);

designations in a numbering system of the industrial-method plant (101).

Embodiment 36

A method according to embodiment 33 to 35, characterised in that the industrial-method plant (101) is activated by test signals for the purpose of structure identification, in particular for determining the structure graph.

Embodiment 37

A method according to one of embodiments 33 to 36, characterised in that the determining of causalities (254) in the determined process structure of the industrial-method plant (101) is performed using one or more of the following:

system input signals (240) and system output signals (242) that are generated on activation of the industrial-method plant (101) by test signals;

expert knowledge (248);

known circuit diagrams and/or procedure diagrams (252);

designations in a numbering system of the industrial-method plant (101).

Embodiment 38

A method according to one of embodiments 33 to 37, characterised in that, for the purpose of structure parameterisation (246) of the relationships in the determined process structure of the industrial-method plant (101), one or more of the following is used:
- methods for determining probability density functions, in particular Gaussian mixture models;
- known physical relationships between process values;
- physical characteristic diagrams of functional elements of the industrial-method plant (101), for example characteristic diagrams of valves (232).

Embodiment 39

A method according to embodiment 38, characterised in that data from regular operation of the industrial-method plant (101) and/or data obtained by activation of the industrial-method plant (101) by test signals are used for the purpose of structure parameterisation (246) using methods for determining probability density functions, in particular using Gaussian mixture models.

Embodiment 40

A method according to embodiment 39, characterised in that the data that are used for structure parameterisation (246) using methods for determining probability density functions, in particular using Gaussian mixture models, are pre-processed before the structure parameterisation (246).

Embodiment 41

A method according to one of embodiments 31 to 40, characterised in that during generation of the anomaly and/or fault model (233) a limit value for the occurrence probability of a process value is established, wherein an anomaly is recognised if this falls below the limit value.

Embodiment 42

A method according to one of embodiments 31 to 41, characterised in that a fault cause of a recognised anomaly and/or a recognised fault situation is identified by means of the method for anomaly and/or fault recognition.

Embodiment 43

A method according to one of embodiments 31 to 42, characterised in that the industrial-method plant (101) comprises or is formed by one or more of the following treatment stations (104) of a painting plant:
- pre-treatment station (112);
- station for cathodic dip coating (114);
- drying stations (116, 120, 124);
- industrial supply air plant (128);
- painting robot.

Embodiment 44

An anomaly and/or fault recognition system (148) for recognising an anomaly and/or fault, which takes a form and is constructed to carry out the method for anomaly and/or fault recognition in an industrial-method plant (101), for example a painting plant (102), according to one of embodiments 31 to 43.

Embodiment 45

An industrial control system (100) that comprises an anomaly and/or fault recognition system (148) according to embodiment 44.

Embodiment 46

An industrial control system that comprises a fault analysis system according to embodiment 14, a prediction system for predicting process deviations in an industrial-method plant according to embodiment 29 and/or an anomaly and/or fault recognition system according to embodiment 44.

The invention claimed is:

1. A method for anomaly and/or fault recognition in an industrial process, the method comprising:
    identifying a process structure of the industrial process comprising determining a structure graph mapping relationships of components, in the industrial process;
    wherein the components comprise sensors and/or actuators;
    wherein the structure graph comprises a plurality of cliques describing physical relationships between the components, and wherein relationships between nodes of each are described by a probability density function of a plurality of probability density functions;
    generating an anomaly and/or fault model of the industrial process, wherein the anomaly and/or fault model comprises the structure graph;
    the anomaly and/or fault model comprising information on an occurrence probability of process values of the industrial process;
    inputting the process values of the industrial process into the anomaly and/or fault model during operation of the industrial process,
    using the probability density functions to recognize an anomaly and/or fault situation by determining the occurrence probability of the inputted process values of the industrial process and by checking the occurrence probability against a limit value; and
    applying at least one corrective measure based on the recognized anomaly and/or fault situation and/or continuing operation of the industrial process.

2. The method according to claim 1, wherein
    the anomaly and/or fault model includes structural data containing information of the process structure of the industrial process, and/or
    the anomaly and/or fault model includes parameterization data containing information on relationships between process values of the industrial process.

3. The method according to claim 1, wherein, for generating the anomaly and/or fault model, one or more of the following steps is carried out:
    determination of causalities in the identified process structure of the industrial process; or
    structure parameterization of the relationships in the identified process structure of the industrial process.

4. The method according to claim 1, wherein determination of the structure graph is performed using one or more of the following:
- a machine learning method;
- expert knowledge;
- known circuit diagrams and/or procedure diagrams; or
- designations in a numbering system of the industrial process.

5. The method according to claim 3, wherein the industrial process is activated by test signals for structure identification for determining the structure graph.

6. The method according to claim 3, wherein the determining of causalities in the identified process structure of the industrial process is performed using one or more of the following:
- system input signals and system output signals that are generated on activation of the industrial process by test signals;
- expert knowledge;
- known circuit diagrams and/or procedure diagrams; or
- designations in a numbering system of the industrial process.

7. The method according to claim 3, wherein, for structure parameterization of the relationships in the identified process structure of the industrial process, one or more of the following is used:
- models for determining probability density functions, wherein the models comprise Gaussian mixture models;
- known physical relationships between process values; or
- physical characteristic diagrams of functional elements of the industrial process.

8. The method according to claim 7, wherein data from regular operation of the industrial process and/or data obtained by activation of the industrial process by test signals are used for structure parameterization using models for determining probability density functions, wherein the models comprise Gaussian mixture models.

9. The method according to claim 8, wherein the data that are used for structure parameterization using models for determining probability density functions, wherein the models comprise Gaussian mixture models.

10. The method according to claim 1, wherein during generation of the anomaly and/or fault model the limit value for the occurrence probability of the process value is established, and wherein an anomaly is recognized if the occurrence probability falls below the limit value.

11. The method according to claim 1, wherein a fault cause of the recognized anomaly and/or a recognized fault situation is identified.

12. The method according to claim 1, wherein the industrial process comprises one or more of the following treatment stations of a painting plant:
- pre-treatment station;
- station for cathodic dip coating;
- drying stations;
- industrial supply air plant; or
- painting robot.

13. An anomaly and/or fault recognition system for recognizing an anomaly and/or fault, which is configured to perform the method for anomaly and/or fault recognition in an industrial process according to claim 1, wherein the industrial process comprises a painting plant.

14. An industrial control system comprising:
- a treatment station; and
- an anomaly and/or fault recognition system according to claim 13.

15. The method according to claim 1, wherein, as a result of allocating a fault cause for a recognized anomaly and/or fault situation, affected ones of the cliques are expanded by adding at least one node and a probability density function of the recognized anomaly and/or fault situation is integrated into a relationship of the added at least one node.

16. A method for anomaly and/or fault recognition in an industrial process, the method comprising:
- generating a structure graph by determining relationships between components of the industrial process;
- wherein the components comprise sensors and/or actuators;
- wherein the structure graph comprises a plurality of cliques describing physical relationships between the components, and wherein relationships between nodes of each are described by a probability density function of a plurality of probability density functions;
- parametrizing the structure graph using a Gaussian mixture model (GMM) to determine the probability density function,
- generating, an anomaly and/or fault model of the industrial process that includes information on an occurrence probability of process values of the industrial process;
- wherein the anomaly and/or fault model comprises the parameterized structure graph;
- inputting the process values of the industrial process into the anomaly and/or fault model during operation of the industrial process;
- using the probability density functions to recognize an anomaly and/or fault situation by determining the occurrence probability of the inputted process values of the industrial process and by checking the occurrence probability against a limit value; and
- applying at least one corrective measure based on the recognized anomaly and/or fault situation and/or continuing operation of the industrial process.

17. The method according to claim 16, wherein
- the anomaly and/or fault model includes structural data containing information on a process structure in the industrial process; and/or
- the anomaly and/or fault model includes data containing information on relationships between process values of the industrial process.

18. The method according to claim 16, wherein, for generating the anomaly and/or fault model, one or more of the following steps is carried out: structure identification for determining a process structure of the industrial process; determination of causalities in the determined process structure of the industrial process; or structure parameterization of the relationships in the determined process structure of the industrial process.

19. The method according to claim 18, wherein, in a context of structure identification for determining a process structure of the industrial process, the structure graph maps relationships in the industrial process.

20. The method according to claim 19, wherein determination of the process structure is performed using one or more of the following:
- a machine learning method;
- expert knowledge;
- known circuit diagrams and/or procedure diagrams; or
- designations in a numbering system of the industrial process.

21. The method according to claim 18, wherein the industrial process is activated by test signals for structure identification for determining the structure graph.

22. The method according to claim 18, wherein the determining of causalities in the determined process structure of the industrial process is performed using one or more of the following:
- system input signals and system output signals that are generated on activation of the industrial process by test signals;
- expert knowledge;
- known circuit diagrams and/or procedure diagrams; or designations in a numbering system of the industrial process.

23. The method according to claim 18, wherein, for structure parameterization of the relationships in the determined process structure of the industrial process, one or more of the following is used: models for determining probability density functions, wherein the models comprise: Gaussian mixture models; known physical relationships between process values; or physical characteristic diagrams of functional elements of the industrial process.

24. The method according to claim 23, wherein data from regular operation of the industrial process and/or data obtained by activation of the industrial process by test signals are used for structure parameterization using models for determining probability density functions, wherein the models comprise Gaussian mixture models.

25. The method according to claim 24, wherein the data that are used for structure parameterization using models for determining probability density functions, wherein the models comprise Gaussian mixture models, are pre-processed before the structure parameterization.

26. The method according to claim 16, wherein during generation of the anomaly and/or fault model the limit value is established, and wherein an anomaly is recognized if the occurrence probability falls below the limit value.

27. The method according to claim 16, wherein a fault cause of a recognized anomaly and/or a recognized fault situation is identified.

28. The method according to claim 16, wherein the industrial process includes or is formed by one or more of the following treatment stations of a painting plant:
- pre-treatment station;
- station for cathodic dip coating;
- drying stations;
- industrial supply air plant; or
- a painting robot.

* * * * *